(12) United States Patent
Maxwell et al.

(10) Patent No.: US 8,175,390 B2
(45) Date of Patent: May 8, 2012

(54) SYSTEM AND METHOD FOR ILLUMINATION INVARIANT IMAGE SEGMENTATION

(75) Inventors: Bruce Allen Maxwell, Benton, ME (US); Richard Mark Friedhoff, New York, NY (US); Casey Arthur Smith, Ithaca, NY (US)

(73) Assignee: Tandent Vision Science, Inc., San Francisco, CA (US)

( * ) Notice: Subject to any disclaimer, the term of this patent is extended or adjusted under 35 U.S.C. 154(b) by 1056 days.

(21) Appl. No.: 12/079,878

(22) Filed: Mar. 28, 2008

(65) Prior Publication Data
US 2009/0245680 A1    Oct. 1, 2009

(51) Int. Cl.
*G06K 9/40* (2006.01)
(52) U.S. Cl. ......... 382/190; 382/199; 382/155; 382/224
(58) Field of Classification Search .................. 382/156, 382/155, 190, 199, 224
See application file for complete search history.

(56) References Cited

U.S. PATENT DOCUMENTS

| | | | | |
|---|---|---|---|---|
| 5,115,477 A * | 5/1992 | Groezinger | ................... | 382/199 |
| 5,638,465 A * | 6/1997 | Sano et al. | ................... | 382/281 |
| 6,748,110 B1 * | 6/2004 | Wallack | ................... | 382/173 |
| 6,768,982 B1 * | 7/2004 | Collins et al. | ................... | 706/45 |
| 7,003,161 B2 | 2/2006 | Tessadro | ................... | 382/199 |
| 7,151,844 B2 * | 12/2006 | Stevenson et al. | ................... | 382/164 |
| 7,245,766 B2 | 7/2007 | Brown et al. | ................... | 382/199 |
| 2003/0215141 A1 * | 11/2003 | Zakrzewski et al. | ................... | 382/190 |
| 2006/0104516 A1 | 5/2006 | Lee et al. | ................... | 382/199 |
| 2006/0177149 A1 * | 8/2006 | Friedhoff et al. | ................... | 382/274 |
| 2006/0291697 A1 * | 12/2006 | Luo | ................... | 382/104 |
| 2007/0036436 A1 * | 2/2007 | Zahniser | ................... | 382/180 |
| 2007/0086658 A1 * | 4/2007 | Kido | ................... | 382/199 |
| 2007/0140556 A1 * | 6/2007 | Willamowski et al. | ................... | 382/167 |
| 2007/0177797 A1 | 8/2007 | Smith et al. | ................... | 382/164 |

OTHER PUBLICATIONS

Filtering for texture—study, Randel et al., IEEE, 0162-8828, 1999, pp. 291-310.*
Randen, T.[Trygve], Husøy, J.H.[John Håkon] "Filtering for Texture Classification: A Comparative Study," PAMI(21), No. 4, Apr. 1999, pp. 291-310.
P. Felzenszwalb and D. Huttenlocher "Distance Transforms of Sampled Functions," *Cornell Computing and Information Science Technical Report*. TR2004-1963, Sep. 2004, pp. 1-15.
Abdi, H. (2007), "Z-scores," in N.J. Salkind (Ed.), *Encyclopedia of Measurement and Statistics*, Thousand Oaks, CA: Sage, pp. 1-4.
Peter J. Rousseeuw "Least Median of Squares Regression," *Journal of the American Statistical Association*, vol. 79, No. 388 (Dec. 1984), pp. 871-880.
Zvi Galil and Giuseppe F. Italiano "Data Structures and Algorithms for Disjoint Set Union Problems," *ACM Computing Surveys*, vol. 23, Issue 3 (Sep. 1991), pp. 319-344.
M. A. Fischler, R. C. Bolles "Random Sample Consensus: A Paradigm for Model Fitting with Applications to Image Analysis and Automated Cartography," *Comm. of the ACM*, vol. 24, pp. 381-395, 1981.

* cited by examiner

*Primary Examiner* — Jayesh A Patel
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file, identifying a boundary in the image, calculating a representation of the boundary extending to segments of the image at either side of the boundary, performing feature calculations on the representation and classifying the boundary as caused by a material change, as a function of the feature calculations.

17 Claims, 16 Drawing Sheets

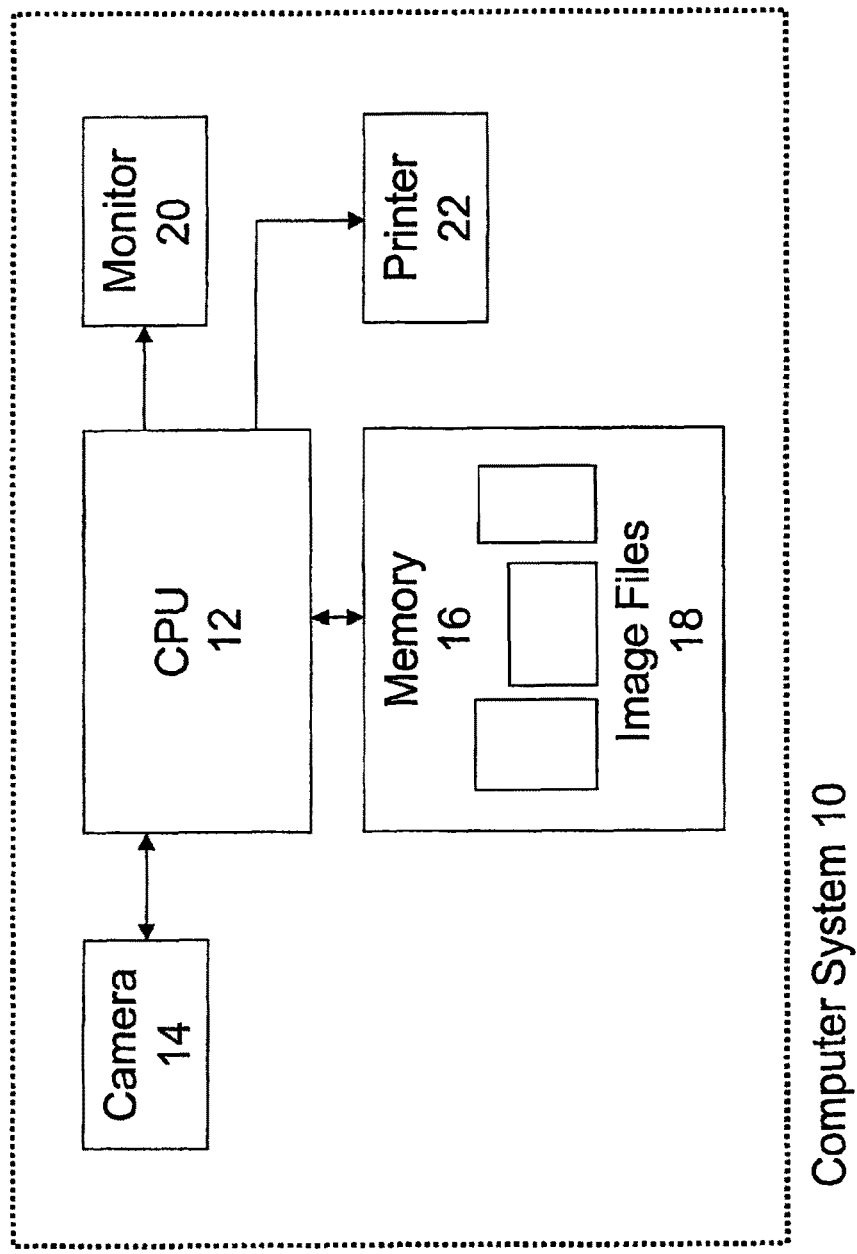
Figure 1: Computer System Configured to Operate on Images

Figure 2: Pixel Array for Storing Image Data

| P(1, 1) | P(1, 2) | ... | P(1, M) |
| P(2, 1) | P(2, 2) | | |
| P(3, 1) | P(3, 2) | | |
| . | | | . |
| . | | | . |
| . | | | . |
| P(N, 1) | ... | | P(N, M) |

Image File 18

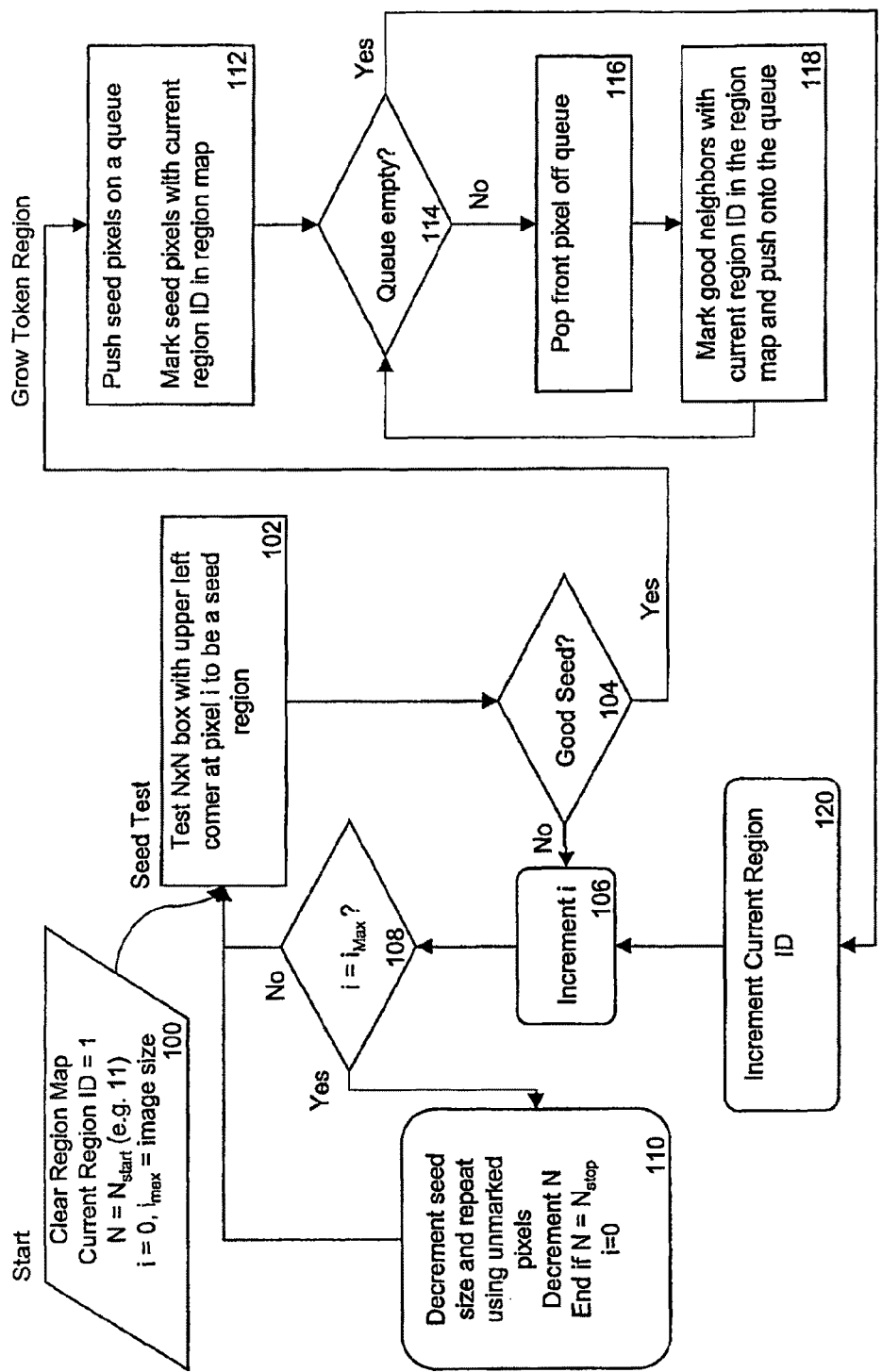
Figure 3A: Identifying Token Regions in an Image

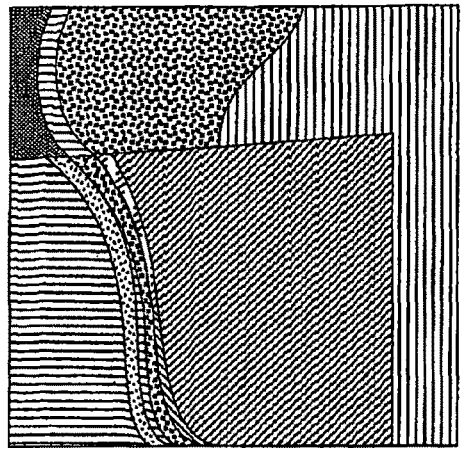
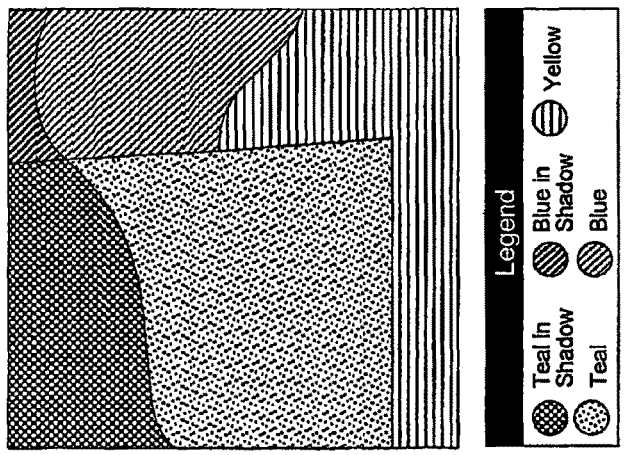
Figure 3C: Token Regions
Figure 3B: Original Image
Figure 3B, 3C: Examples of Identifying Token Regions in an Image

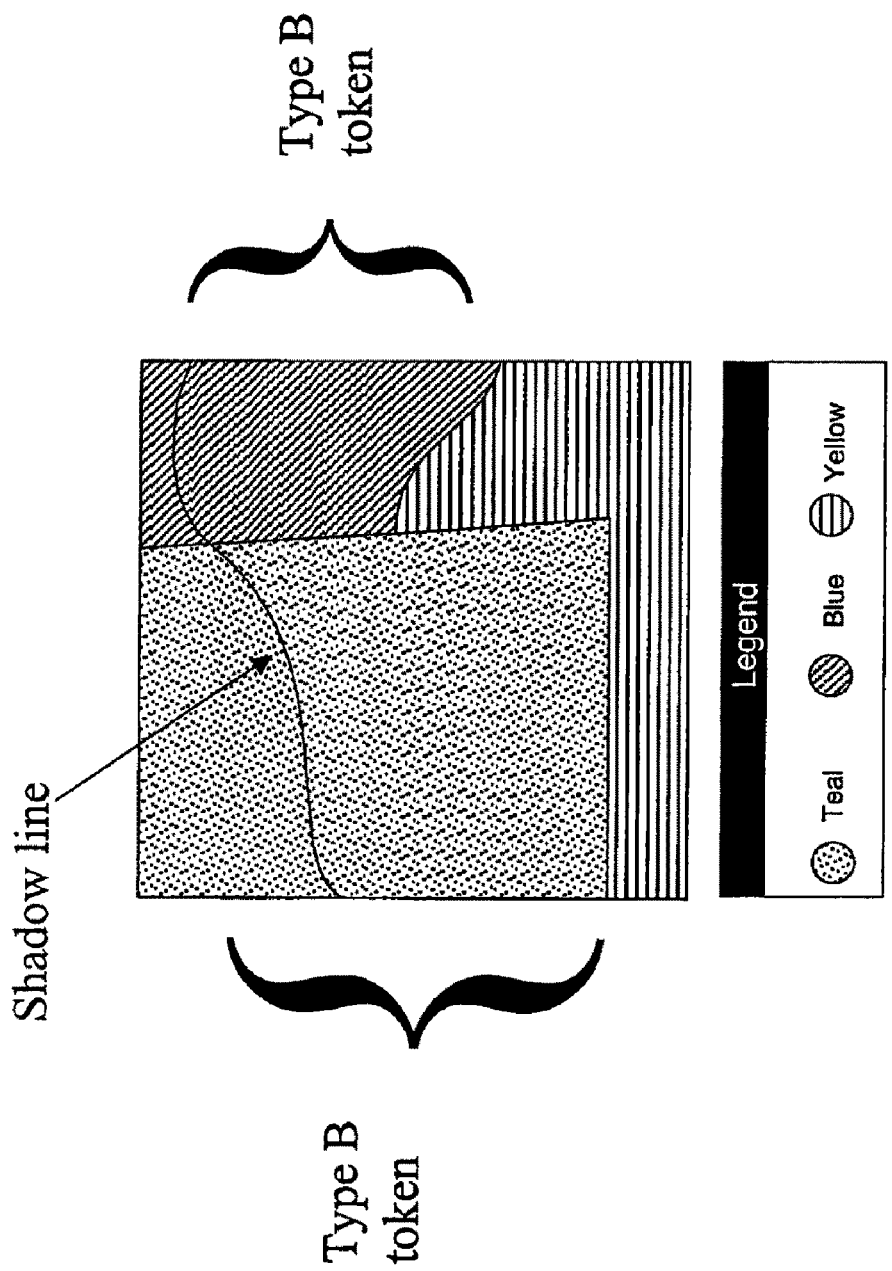

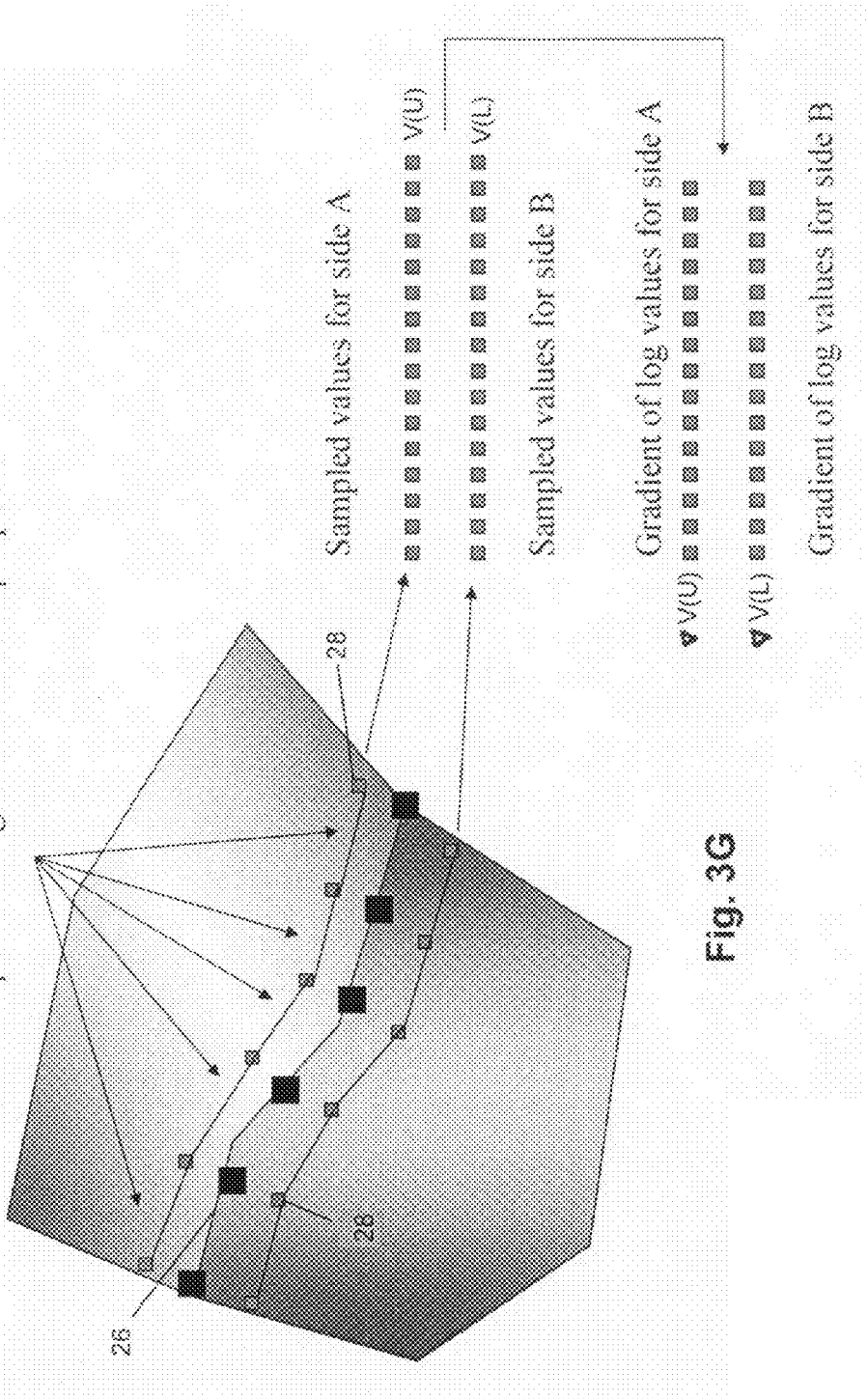

SYSTEM AND METHOD FOR ILLUMINATION INVARIANT IMAGE SEGMENTATION

BACKGROUND OF THE INVENTION

A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object edge within an image has been a persistent challenge to scientists. An early and conventional approach to object edge detection involves an analysis of brightness boundaries in an image. In the analysis it is assumed that a boundary caused by a material object will be sharp, while a boundary caused by a shadow will be soft or gradual due to the penumbra effect of shadows. While this approach can be implemented by algorithms that can be accurately executed by a computer, the results will often be incorrect. In the real world there are many instances wherein shadows form sharp boundaries, and conversely, material object edges form soft boundaries. Thus, when utilizing conventional techniques for shadow and object edge recognition, there are significant possibilities for false positives and false negatives for shadow recognition. That is, for example, a material edge that imitates a shadow and is thus identified incorrectly by a computer as a shadow or a sharp shadow boundary that is incorrectly interpreted as an object boundary. Accordingly, there is a persistent need for the development of accurate and correct techniques that can be utilized in the operation of computers relating to images, to, for example, identify material characteristics of the image by an illumination invariant image segmentation.

SUMMARY OF THE INVENTION

The present invention is directed to a system and method for generating an illumination invariant segmentation of an image.

In a first exemplary embodiment of the present invention, an automated, computerized method is provided for processing an image. According to a feature of the present invention, the method comprises the steps of providing an image file depicting the image, identifying a boundary in the image, calculating a representation of the boundary extending to segments of the image at either side of the boundary, performing feature calculations on the representation and classifying the boundary as caused by a material change, as a function of the feature calculations. In a preferred embodiment, likelihood data is generated by the calculations, and the classifying is performed as a function of the likelihood data.

In a second exemplary embodiment of the present invention an automated, computerized method is provided for processing an image. According to a feature of the present invention, the method comprises the steps of providing an image file including pixels forming the image, identifying a boundary in the image, selecting representative pixels of the image relevant to the boundary, performing a feature calculation on the representative pixels, and classifying the boundary as caused by a material change, as a function of the feature calculation.

In a third exemplary embodiment of the present invention, a computer system is provided. The computer system comprises a CPU and a memory storing an image file containing an image. Pursuant to a feature of the present invention, the CPU is arranged and configured to execute a routine to identify a boundary in the image, calculate a representation of the boundary extending to segments of the image at either side of the boundary, perform feature calculations on the representation and classify the boundary as caused by a material change, as a function of the feature calculations.

In a fourth exemplary embodiment of the present invention, a computer system is provided. The computer system comprises a CPU and a memory storing an image file including pixels forming an image. Pursuant to a feature of the present invention, the CPU is arranged and configured to execute a routine to identify a boundary in the image, select representative pixels of the image relevant to the boundary, perform a feature calculation on the representative pixels and classify the boundary as caused by a material change.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 3*a* is a flow chart for identifying Type C token regions in the image file of FIG. 2, according to a feature of the present invention.

FIG. 3*b* is an original image used as an example in the identification of Type C tokens.

FIG. 3*c* shows Type C token regions in the image of FIG. 3*b*.

FIG. 3*d* shows Type B tokens, generated from the Type C tokens of FIG. 3*c*, according to a feature of the present invention.

FIG. 3*g* shows another representation of a boundary between two Type B tokens of FIG. 3*d*, according to a feature of the present invention.

DETAILED DESCRIPTION OF THE PREFERRED EMBODIMENTS

Figure 3E:
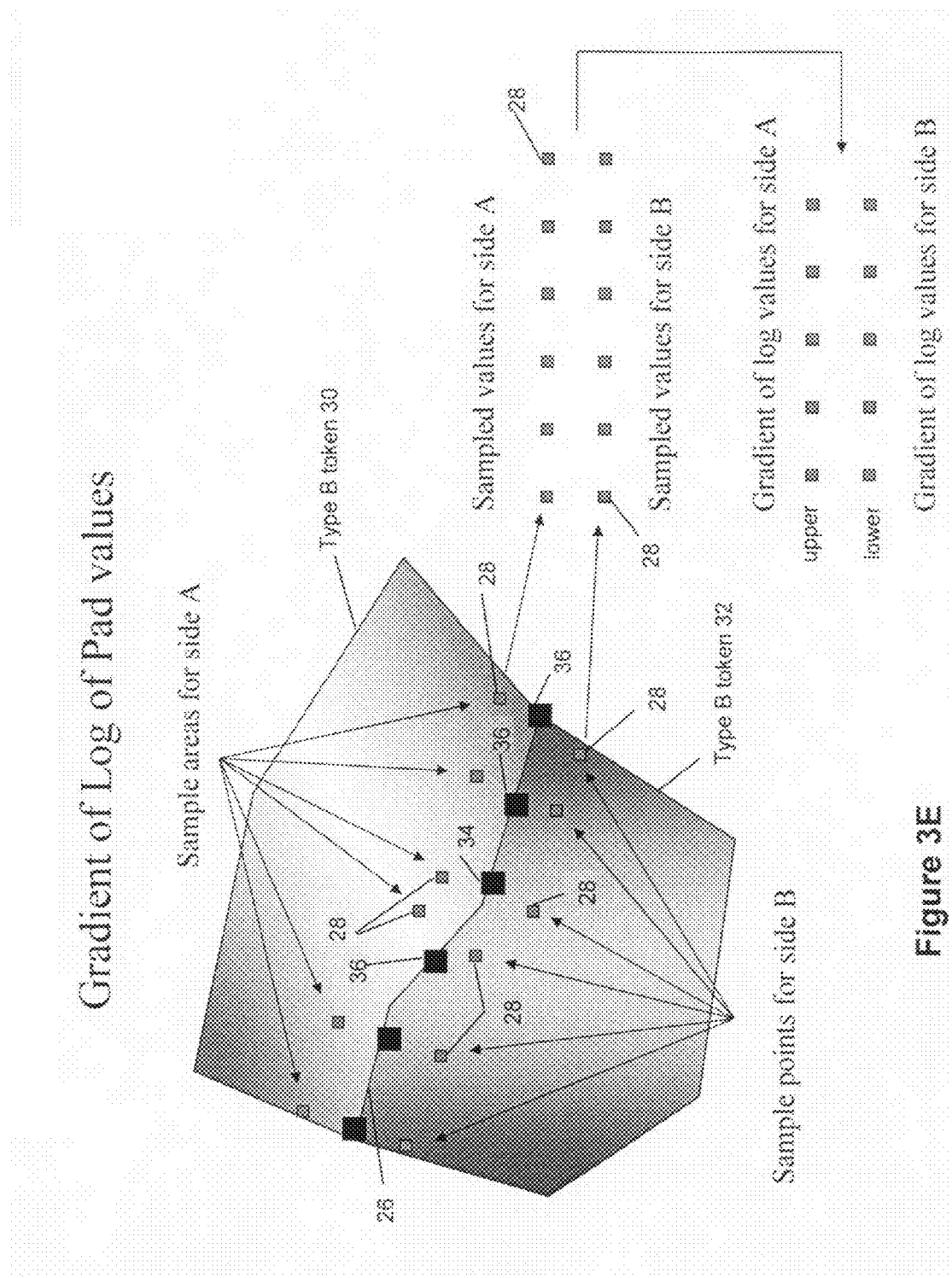
FIG. 3*e* shows a representation of a boundary between two Type B tokens of FIG. 3*d*, according to a feature of the present invention.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n X m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electromagnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, to identify regions of an image that correspond to a single material depicted in a scene recorded in the image file 18. A fundamental observation underlying a basic discovery of the present invention, is that an image comprises two components, material and illumination. All changes in an image are caused by one or the other of these components. Thus, each image comprises two intrinsic images, one corresponding to the illumination, and the other to the materials depicted in, for example, a scene recorded in the image. According to an exemplary embodiment of the present invention, boundaries in an image of an image file 18 are classified as being a material boundary on a smooth surface as opposed to another type of boundary, for example, an illumination edge, depth boundary or simultaneous illumination and material change. The classification is performed by identifying a boundary to be classified, generating a representation of the boundary, calculating a set of features at the identified boundary utilizing the representation, and thereafter, utilizing the calculated features to classify the boundary.

Boundaries in an image depicted in an image file 18 can be identified using any known computer vision techniques or methods. In accordance with an exemplary embodiment of the present invention, the boundaries are identified through the generation of Type B tokens in the image, and utilizing the boundaries formed between adjacent tokens. Pursuant to a feature of the present invention, a token is defined as a connected region of an image wherein the pixels of the region are related to one another in a manner relevant to identification of image features and characteristics such as identification of materials and illumination. The pixels of a token can be related in terms of either homogeneous factors, such as, for example, close correlation of color among the pixels, or inhomogeneous factors, such as, for example, differing color values related geometrically in a color space such as RGB space, commonly referred to as a texture.

Exemplary embodiments of the present invention provide methods and systems to identify various types of homogeneous or inhomogeneous tokens. The present invention utilizes spatio-spectral information relevant to contiguous pixels of an image depicted in an image file 18 to identify token regions. The spatio-spectral information includes spectral relationships among contiguous pixels, in terms of color bands, for example the RGB values of the pixels, and the spatial extent of the pixel spectral characteristics relevant to a single material.

According to one exemplary embodiment of the present invention, tokens are each classified as either a Type A token, a Type B token or a Type C token. A Type A token is a connected image region comprising contiguous pixels that represent the largest possible region of the image encompassing a single material in the scene. A Type B token is a connected image region comprising contiguous pixels that represent a region of the image encompassing a single material in the scene, though not necessarily the maximal region corresponding to that material. A Type C token comprises a connected image region of similar image properties among the contiguous pixels of the token, where similarity is defined with respect to a noise model for the imaging system used to record the image. Once an image is analyzed to generate Type B token regions, the boundaries between the tokens are classified as either caused by illumination change or material change.

Referring now to FIG. 3*a*, there is shown a flow chart for identifying Type C token regions in the scene depicted in the image file 18 of FIG. 2, according to a feature of the present invention. Type C tokens can be readily identified in an image, utilizing the steps of FIG. 3*a*, and then analyzed and processed to construct Type B tokens. The boundaries between Type B tokens constructed according to a feature of the present invention are then classified to further segment the image.

Prior to execution of the routine of FIG. 3*a*, the CPU 12 can operate to filter the image depicted in a subject image file 18. The filters may include a texture filter, to, for example, transform patterns of differing reflectance caused by a textured material into a homogeneous representation that captures the spectral and spatial characteristics of the textured region. Identification of tokens can be difficult in a textured image. A textured image contains materials with, for example, more than one reflectance function that manifests as a defining characteristic. For example, the defining characteristic can be a pattern of colors within the texture, such that the texture displays a certain distribution of colors in any patch or region selected from anywhere within the textured region of the image.

Other textures can be defined by geometric characteristics, such as stripes or spots. The CPU 12 can execute a software module that implements any well known method, such as, for example, a Laws filter bank, wavelets or textons (see, for example, Randen, T.[Trygve], Husoy, J. H.[John Hakon], Filtering for Texture Classification: A Comparative Study, PAMI(21), No. 4, April 1999, pp. 291-310.), or convert a local area around each pixel to an histogram. Any method utilized will convert each pixel value of N color bands to a vector of T values representing the output of one or more functions applied to a local area around the pixel, for example, an 11×11 pixel array.

For example, an histogram representation for each pixel can be produced using the following algorithm:
Loop over all pixels p in an N-band (for example, RGB) input color image;
A) Initialize N 8-bin histograms to zero, one for each color band
B) For each pixel q within a neighborhood of p (for example, an 11×11 pixel box)
(i) For each of the N color values Cn of q;
(a) Increment the appropriate bins of the nth histogram;
(b) Use interpolation so that the two bins closest to the color value get incremented proportionally;
(ii) Concatenate the N 8-bin histogram values together into a single 8×N element vector;
(iii) Assign the 8×N element vector to the corresponding pixel p in the output image.

After the transformation from a set of color bands to a set of filter outputs, the image is treated exactly as the original color band image with respect to identifying type C tokens.

In many instances, the texture filters may only be required on part of an input image, as much of the image may include homogeneously colored objects. Therefore, prior to application of the texture filters, it is useful to identify and mask off regions of homogeneous color. The texture filters are then only applied to areas where there appear to be textured materials. An example algorithm for identifying textured regions is as follows:
1) Execute a type C tokenization on the N-band color values (e.g. RGB), storing the token results in a region map R, where each pixel in the region map has the token ID of the token to which it belongs.
2) Execute a median filter on the region map R (e.g. each pixel P_ij is replaced by the median token ID of a 7×7 box around P_ij). Store the result in R-median.
3) Execute a filter on the original image that calculates the standard deviation of the pixels in a box around each pixel (e.g. 7×7) for each color band. Put the result in S.
4) For each pixel in S, divide the standard deviation calculated for each color band by an estimated noise model value. An example noise model is Sn=A*maxValue+B*pixelValue, where maxValue is the maximum possible color band value, pixelValue is the intensity of a particular band, and A and B are constants experimentally determined for the imaging system (e.g. A=0.001 and B=0.06 are typical). This step converts the standard deviation into a normalized deviation for each color band. Store the results in Sn.
5) For each pixel in Sn, sum the squares of the normalized deviations for all N color bands, take the square root of the result and divide by the number of bands N to create a deviation value D_ij. Compare the resulting deviation value D_ij to a threshold (e.g. 1.0) assign a 1 to any pixel with a deviation value higher than the threshold, otherwise assign the pixel a 0. Store the results in a texture mask image T.
6) For each pixel in T, if the texture mask value T_ij=1 and the seed size of the token region with the id given in the median region map R-median_ij is less than a threshold (e.g. <4), label the pixel as a textured pixel. Otherwise, label it as a homogeneous pixel. Store the result in the texture mask Tmask.

The output of the above algorithm is a mask, Tmask, which is the size of the original image. Pixels of Tmask with a 1 value should be treated as part of an image region corresponding to texture materials and pixels with a value of 0 should be treated as part of an image region corresponding to materials of homogeneous color.

A $1^{st}$ order uniform, homogeneous Type C token comprises a single robust color measurement among contiguous pixels of the image. At the start of the identification routine, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=$N_{start}$. $N_{start}$ can be any integer>0, for example it can be set at set at 11 or 15 pixels.

At step 102, a seed test is begun. The CPU 12 selects a first pixel, i=(1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel or the filter output representation of the pixel, in the event the image was filtered, as described above. If the comparison does not result in approximately equal values (within the noise levels of the recording device) for the pixels in the seed, the CPU 12 increments the value of i (step 106), for example, i=(1, 2), for a next N×N seed sample, and then tests to determine if i=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at i=(n, m). In this manner, the routine of FIG. 3a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token.

When the queue is empty, the CPU 12 proceeds to step 120. At step 120, the CPU 12 increments the region ID for use with identification of a next token. The CPU 12 then returns to step 106 to repeat the routine in respect of the new current token region.

Upon arrival at $N=N_{stop}$, step 110 of the flow chart of FIG. 3a, or completion of a region map that coincides with the image, the routine will have completed the token building task. FIG. 3b is an original image used as an example in the identification of tokens. The image shows areas of the color blue and the blue in shadow, and of the color teal and the teal in shadow. FIG. 3c shows token regions corresponding to the region map, as identified through execution of the routine of FIG. 3a (Type C tokens), in respect to the image of FIG. 3b. The token regions are color coded to illustrate the token makeup of the image of FIG. 3b, including penumbra regions between the full color blue and teal areas of the image and the shadow of the colored areas.

While each Type C token comprises a region of the image having a single robust color measurement among contiguous pixels of the image, the token may grow across material boundaries. Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 4:
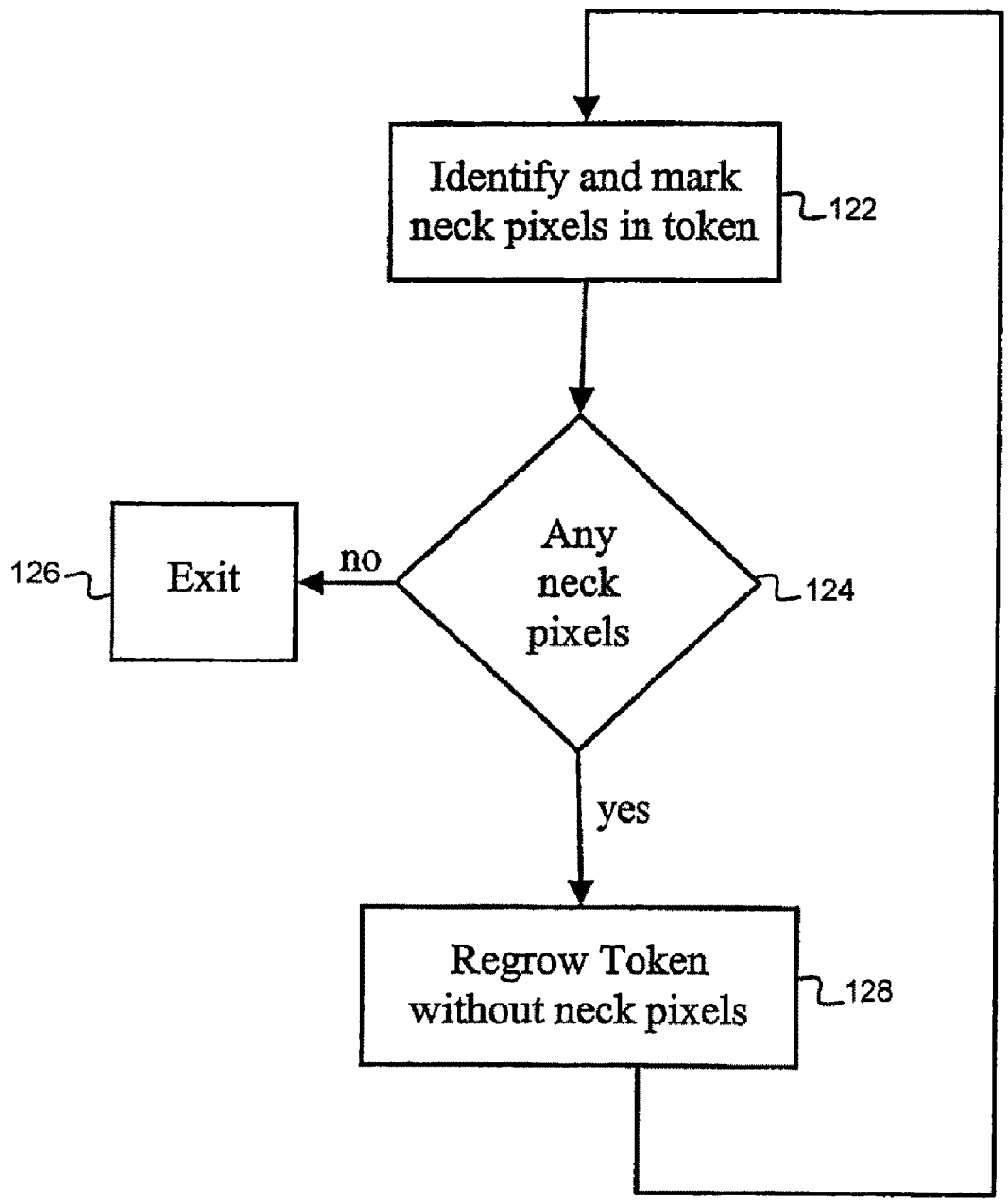
FIG. 4 is a flow chart for a routine to test Type C tokens identified by the routine of the flow chart of FIG. 3*a*, according to a feature of the present invention.

FIG. 4 shows a flow chart for a neck test for Type C tokens. In step 122, the CPU 12 examines each pixel of an identified token to determine whether any of the pixels under examination forms a neck. The routine of FIG. 4 can be executed as a subroutine directly after a particular token is identified during execution of the routine of FIG. 3a. All pixels identified as a neck are marked as "ungrowable." In decision block 124, the CPU 12 determines if any of the pixels were marked.

If no, the CPU 12 exits the routine of FIG. 4 and returns to the routine of FIG. 3a (step 126).

If yes, the CPU 12 proceeds to step 128 and operates to regrow the token from a seed location selected from among the unmarked pixels of the current token, as per the routine of FIG. 3a, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token.

Neck testing identifies Type C tokens that cross material boundaries, and regrows the identified tokens to provide single material Type C tokens suitable for use in creating Type B tokens. FIG. 3d shows Type B tokens generated from the Type C tokens of FIG. 3c, according to a feature of the present invention. The present invention provides several exemplary techniques of pixel characteristic analysis for constructing Type B tokens from Type C tokens. One exemplary technique involves arbitrary boundary removal. The arbitrary boundary removal technique can be applied to Type C tokens wether they were generated using N color band values (RGB in our example) of the pixel or the filter output representation of the pixel, in the event the image was filtered. Actual boundaries of any particular Type C token will be a function of the seed location used to generate the token, and are thus, to some extent arbitrary. There are typically many potential seed locations for each particular token, with each potential seed location generating a token with slightly different boundaries and spatial extent because of differences among the color values of the pixels of the various seeds, within the noise ranges of the recording equipment.

Figure 5:
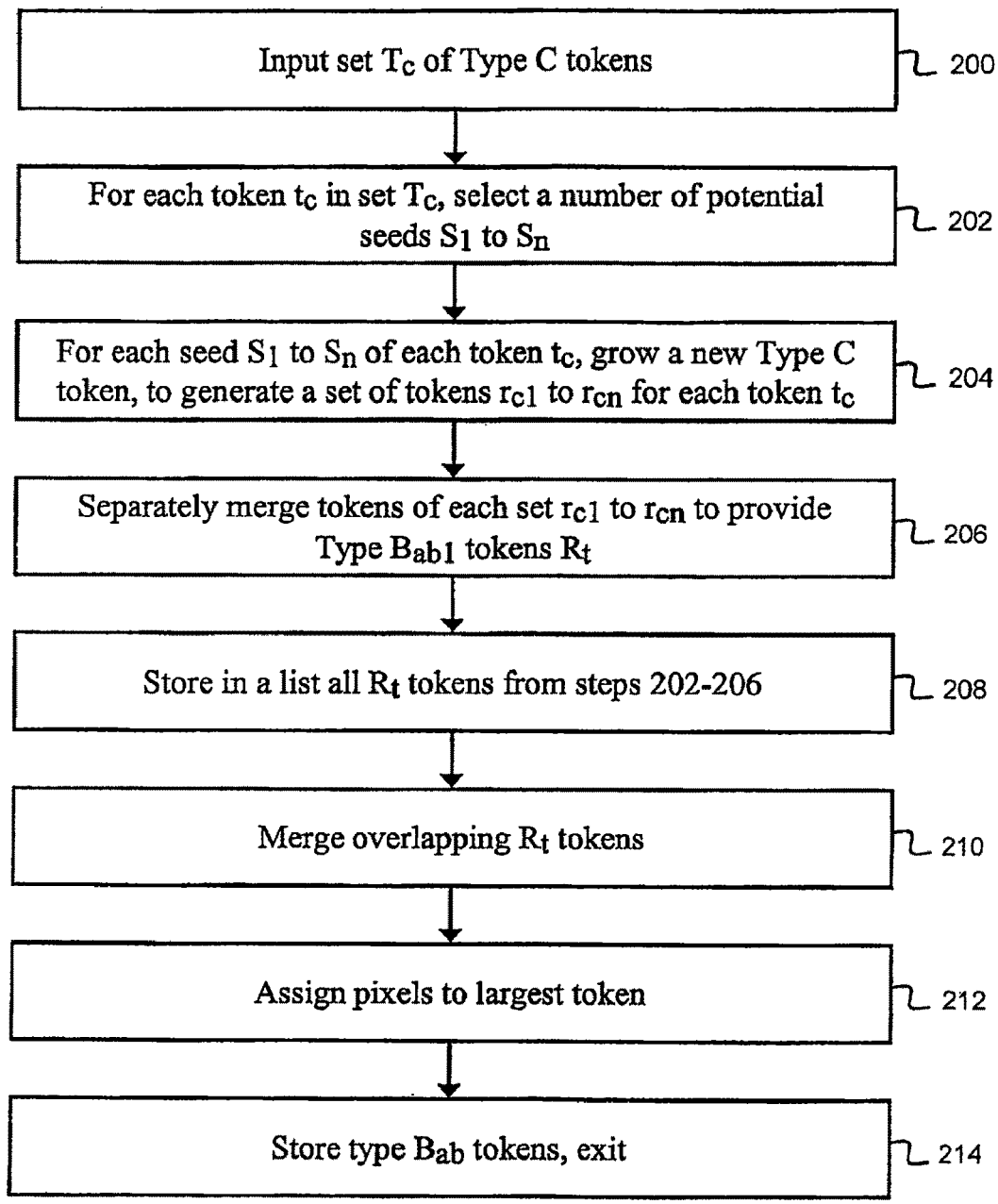
FIG. 5 is a flow chart for constructing Type B tokens via an arbitrary boundary removal technique, according to a feature of the present invention.

FIG. 5 is a flow chart for constructing Type B tokens via an arbitrary boundary removal technique, according to a feature of the present invention. In step 200, the CPU 12 is provided with a set ($T_c$) of Type C tokens generated with a seed size (S) via the routine of FIG. 3a, with neck removal via the routine of FIG. 4. The seed size $S=S_{max}$, for example, S=4 pixels. In step 202, for each Type C token, $t_c$ in the set $T_c$ the CPU 12 selects a number (for example 50) of potential seeds $s_1$ to $s_n$. In our example, each selected seed will be a 4×4 pixel array from within the token region, the pixels of the array being of approximately equal values (within the noise levels of the recording device).

In step 204, the CPU 12 grows a new Type C token, utilizing the routines of FIGS. 3a and 4, from each seed location, $s_1$ to $s_n$ of each token $t_c$ in the set $T_c$. The newly grown tokens for each token $t_c$ are designated as tokens $r_{c1}$ to $r_{cn}$. The newly grown tokens $r_{c1}$ to $r_{cn}$ for each token $t_c$ generally overlap the original Type C token $t_c$, as well as one another.

In step 206, the CPU 12 operates to merge the newly generated tokens $r_{c1}$ to $r_{cn}$ of each token $t_c$, respectively. The result is a new token $R_t$ corresponding to each original token $t_c$ in the set $T_c$. Each new token $R_t$ encompasses all of the regions of the respective overlapping tokens $r_{c1}$ to $r_{cn}$ generated from the corresponding original token $t_c$. The unions of the regions comprising the respective merged new tokens $R_t$ are each a more extensive token than the original Type C tokens of the set. The resulting merged new tokens $R_t$ result in regions of the image file 18, each of a much broader range of variation between the pixels of the respective token $R_t$ than the original Type C token, yet the range of variation among the constituent pixels will still be relatively smooth. $R_t$ is defined as a limited form of Type B token, Type $B_{ab1}$, to indicate a token generated by the first stage (steps 200-206) of the arbitrary boundary removal technique according to a feature of the present invention.

In step 208, the CPU 12 stores each of the Type $B_{ab1}$ tokens generated in steps 202-206 from the set of tokens $T_c$, and proceeds to step 210. Type $B_{ab1}$ tokens generated via execution of steps 202-206 may overlap significantly. In step 210, the CPU 12 operates to merge the $R_t$ tokens stored in step 208 that overlap each other by a certain percentage of their respective sizes. For example, a 30% overlap is generally sufficient to provide few, if any, false positive merges that combine regions containing different materials. The new set of merged tokens still may have overlapping tokens, for example, previously overlapping tokens that had a less than 30% overlap. After all merges are complete, the CPU 12 proceeds to step 212.

In step 212, the CPU 12 identifies all pixels that are in more than one token (that is in an overlapping portion of two or more tokens). Each identified pixel is assigned to the token occupying the largest region of the image. Thus, all overlapping tokens are modified to eliminate all overlaps.

In step 214, the CPU 12 stores the final set of merged and modified tokens, now designated as Type $B_{ab2}$ tokens, and then exits the routine. As noted above, the Type $B_{ab2}$ tokens were generated from Type C tokens wether the Type C tokens were generated using N color band values (RGB in our example) of the pixel or the filter output representation of the pixel, in the event the image was filtered.

Figure 6:
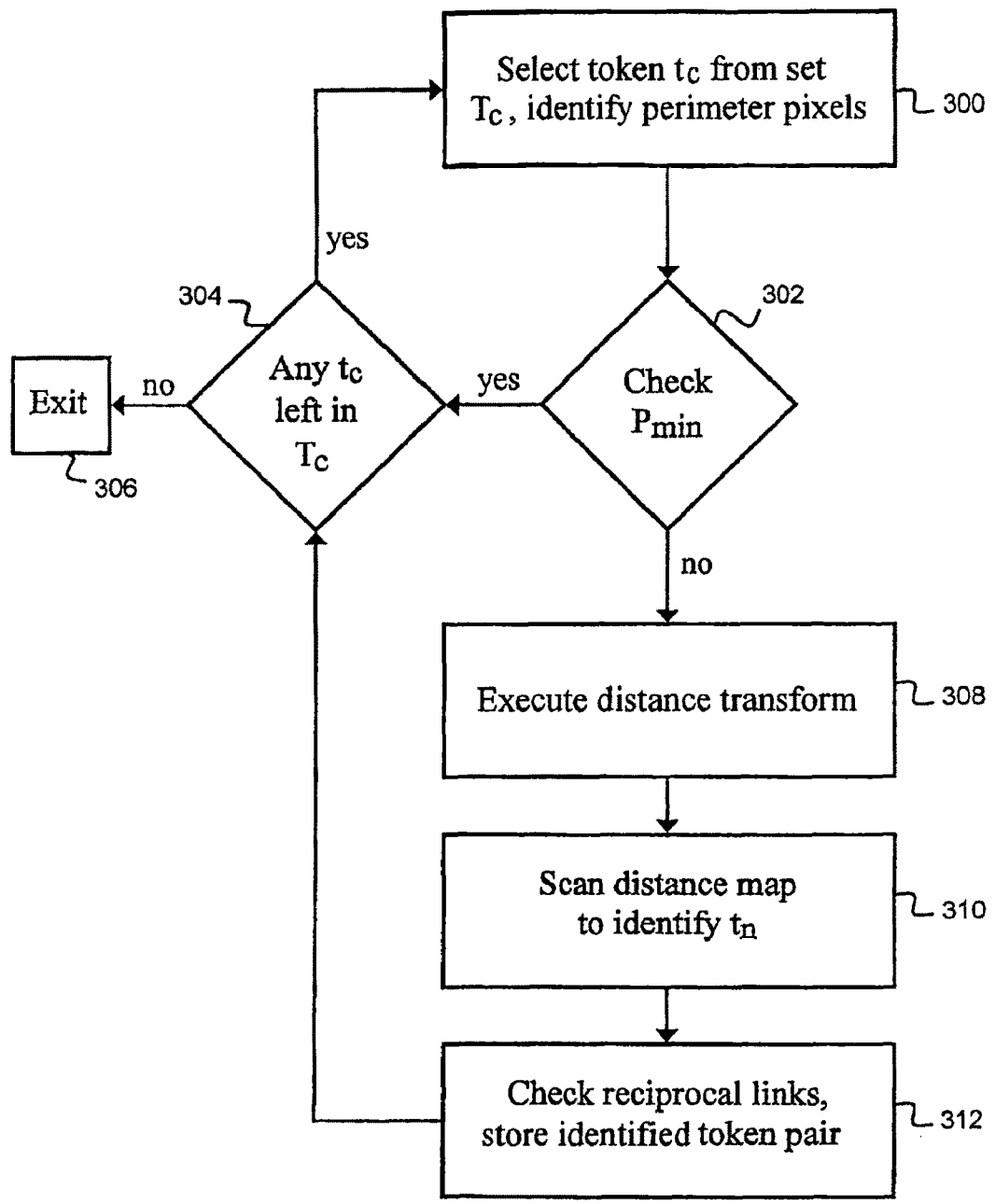
FIG. 6 is a flow chart for creating a token graph, according to a feature of the present invention.

A second exemplary technique according to the present invention, for using Type C tokens to create Type B tokens, is adjacent planar token merging. The adjacent planar token merging can be implemented when an image depicts areas of uniform color, that is for non-textured regions of an image. Initially, a token graph is used to identify tokens that are near to one another. FIG. 6 shows a flow chart for creating a token graph, according to a feature of the present invention. Each token $t_c$ in the set of Type C tokens $T_c$, generated through execution of the routines of FIGS. 3a and 4, is evaluated in terms of a maximum distance $D_{max}$ between tokens defining a neighboring pair of tokens, $t_c$, $t_n$, of the set $T_c$, a minimum number of token perimeter pixels, $P_{min}$, in each token of the neighboring pair of tokens, and a minimum fraction of perimeter pixels, $F_{min}$, of each token of a neighboring pair of tokens, required to be within $D_{max}$.

In step 300, the CPU 12 selects a Type C token $t_c$ in the set of Type C tokens $T_c$, and identifies the pixels of the selected token $t_c$ forming the perimeter of the token. In a decision block 302, the CPU 12 determines whether the number of perimeter pixels is less than $P_{min}$, for example 10 pixels.

If yes, the CPU 12 proceeds to decision block 304 to determine whether there are any remaining tokens $t_c$ in the set of Type C tokens $T_c$. If yes, the CPU 12 returns to step 300, if no, the CPU 12 exits the routine 306.

If no, the CPU 12 proceeds to step 308. In step 308, the CPU 12 generates a bounding box used as a mask to surround the selected token $t_c$. The bounding box is dimensioned to be at least $D_{max}$ larger than the selected token $t_c$ in all directions. A known distance transform (for example, as described in P. Felzenszwalb and D. Huttenlocher, Distance Transforms of Sampled Functions, Cornell Computing and Information Science Technical Report TR2004-1963, September 2004), is executed to find the distance from each perimeter pixel of the selected token $t_c$ to all the pixels in the surrounding bounding box. The output of the distance transform comprises two maps, each of the same size as the bounding box, a distance map and a closest pixel map. The distance map includes the Euclidean distance from each pixel of the bounding box to the nearest perimeter pixel of the selected token $t_c$. The closest pixel map identifies, for each pixel in the distance map, which perimeter pixel is the closest to it.

In step 310, the CPU 12 scans the distance map generated in step 308 to identify tokens corresponding to pixels of the bounding box (from the region map generated via the routine of FIG. 3a), to identify a token from among all tokens represented by pixels in the bounding box, that has a number $N_{cn}$ of pixels within the distance $D_{max}$, wherein $N_{cn}$ is greater than $P_{min}$, and greater than $F_{min}$*perimeter pixels of the respective token and the average distance between the respective token and $t_c$ is the lowest of the tokens corresponding to the pixels in the bounding box. If these gconditions are satisfied, the respective token is designated $t_n$ of a possible token pair $t_c$, $t_n$, and a link $L_{cn}$ is marked active.

In step 312, the CPU 12 checks to determine whether a reciprocal link $L_{cn}$ is also marked active, and when it is marked active, the CPU 12 marks and stores in the token graph, an indication that the token pair $t_c$, $t_n$ is a neighboring token pair. The reciprocal link refers to the link status in the evaluation of the token designated as $t_n$ in the current evaluation. If that token has yet to be evaluated, the pair is not designated as a neighboring token pair until the link $L_{cn}$ is verified as active in the subsequent evaluation of the token $t_n$. The CPU 12 then returns to decision block 304 to determine whether there are any further tokens in the set $T_c$.

Figure 7:
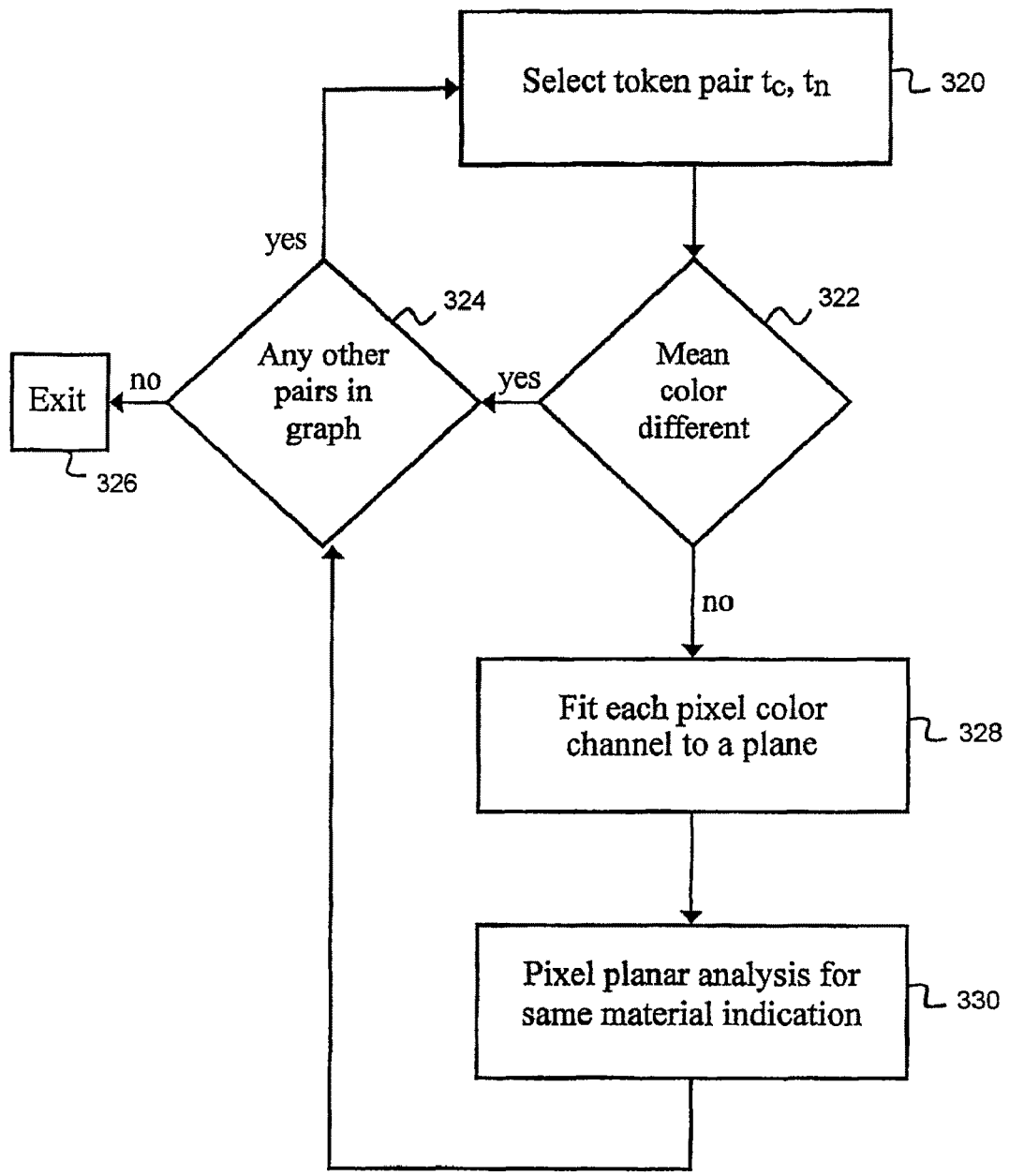
FIG. 7 is a flow chart for constructing Type B tokens via an adjacent planar token merging technique, according to a feature of the present invention.

Upon completion of the token graph, the CPU 12 utilizes token pair information stored in the graph in the execution of the routine of FIG. 7. FIG. 7 shows a flow chart for constructing Type B tokens via the adjacent planar token merging technique, according to a feature of the present invention. In the adjacent planer merging technique, pairs of tokens are examined to determine wether there is a smooth and coherent change in color values, in a two dimensional measure, between the tokens of the pair. The color change is examined in terms of a planar representation of each channel of the color, for example the RGB components of the pixels according to the exemplary embodiments of the present invention. A smooth change is defined as the condition when a set of planes (one plane per color component) is a good fit for the pixel values of two neighboring tokens. In summary, neighboring tokens are considered the same material and a Type B token when the color change in a two-dimensional sense is approximately planar.

In step 320, the CPU 12 selects a token pair $t_c$, $t_n$ from the token graph. In decision block 322, the CPU 12 determines whether the mean color in token $t_c$ is significantly different from the mean color in the token $t_c$. The difference can be a function of a z-score, a known statistical measurement (see, for example, Abdi, H. (2007), Z-scores, in N. J. Salkind (Ed.), Encyclopedia of Measurement and Statistics, Thousand Oaks, Calif.: Sage), for example, a z-score greater than 3.0.

If the mean colors of the token pair are different, the CPU 12 proceeds to decision block 324 to determine whether there are any additional token pairs in the token graph. If yes, the CPU 12 returns to step 320. If no, the CPU 12 exits the routine (step 326).

If the mean colors are within the z-score parameter, the CPU 12 proceeds to step 328. In step 328, the CPU 12 performs a mathematical operation such as, for example, a least median of squares regression (see, for example, Peter J. Rousseeuw, Least Median of Squares Regression, Journal of the American Statistical Association, Vol. 79, No. 388 (December 1984), pp. 871-880) to fit a plane to each color channel of the pixels (in our example RGB) of the token pair $t_c$, $t_n$, as a function of row n and column m (see FIG. 2), the planes being defined by the equations:

$$R = X_{Rn} + Y_{Rm} + Z_R \quad G = X_{Gn} + Y_{Gm} + Z_G \quad B = X_{Bn} + Y_{Bm} + Z_B$$

wherein parameter values X, Y and C are determined by the least median of squares regression operation of the CPU 12.

Upon completion of the plane fitting operation, the CPU 12 proceeds to step 330. In step 330, the CPU 12 examines each pixel of each of the tokens of the token pair $t_c$, $t_n$ to calculate the z-score between each pixel of the tokens and the planar fit expressed by the equation of the least median of squares regression operation. When at least a threshold percentage of the pixels of each token of the pair (for example, 80%), are within a maximum z-score (for example, 0.75), then the neighboring token pair is marked in the token graph as indicating the same material in the image. After completion of step 330, the CPU 12 returns to decision block 324.

Upon exiting the routine of FIG. 7, the CPU 12 examines the token graph for all token pairs indicating the same material. The CPU 12 can achieve the examination through performance of a known technique such as, for example, a union find algorithm. (See, for example, Zvi Galil and Giuseppe F. Italiano. Data structures and algorithms for disjoint set union problems, ACM Computing Surveys, Volume 23, Issue 3 (September 1991), pages 319-344). As a simple example, assume a set of seven Type C tokens $T_1, T_2, T_3, T_4, T_5, T_6, T_7$. Assume that the result of the execution of FIG. 7, (performance of the adjacent planar analysis), indicates that tokens $T_1$ and $T_2$ are marked as the same material, and tokens $T_1$ and $T_3$ are also marked as the same material. Moreover, the results further indicate that tokens $T_4$ and $T_5$ are marked as the same material, and tokens $T_5$ and $T_6$ are also marked as the same material. The result of execution of the union find algorithm would therefore indicate that tokens $\{T_1, T_2, T_3\}$ form a first group within the image consisting of a single material, tokens $\{T_4, T_5, T_6\}$ form a second group within the image consisting of a single material, and token $\{T_7\}$ forms a third group within the image consisting of a single material. The groups $\{T_1, T_2, T_3\}, \{T_4, T_5, T_6\}$ and $\{T_7\}$ form three Type B tokens.

Figure 8:
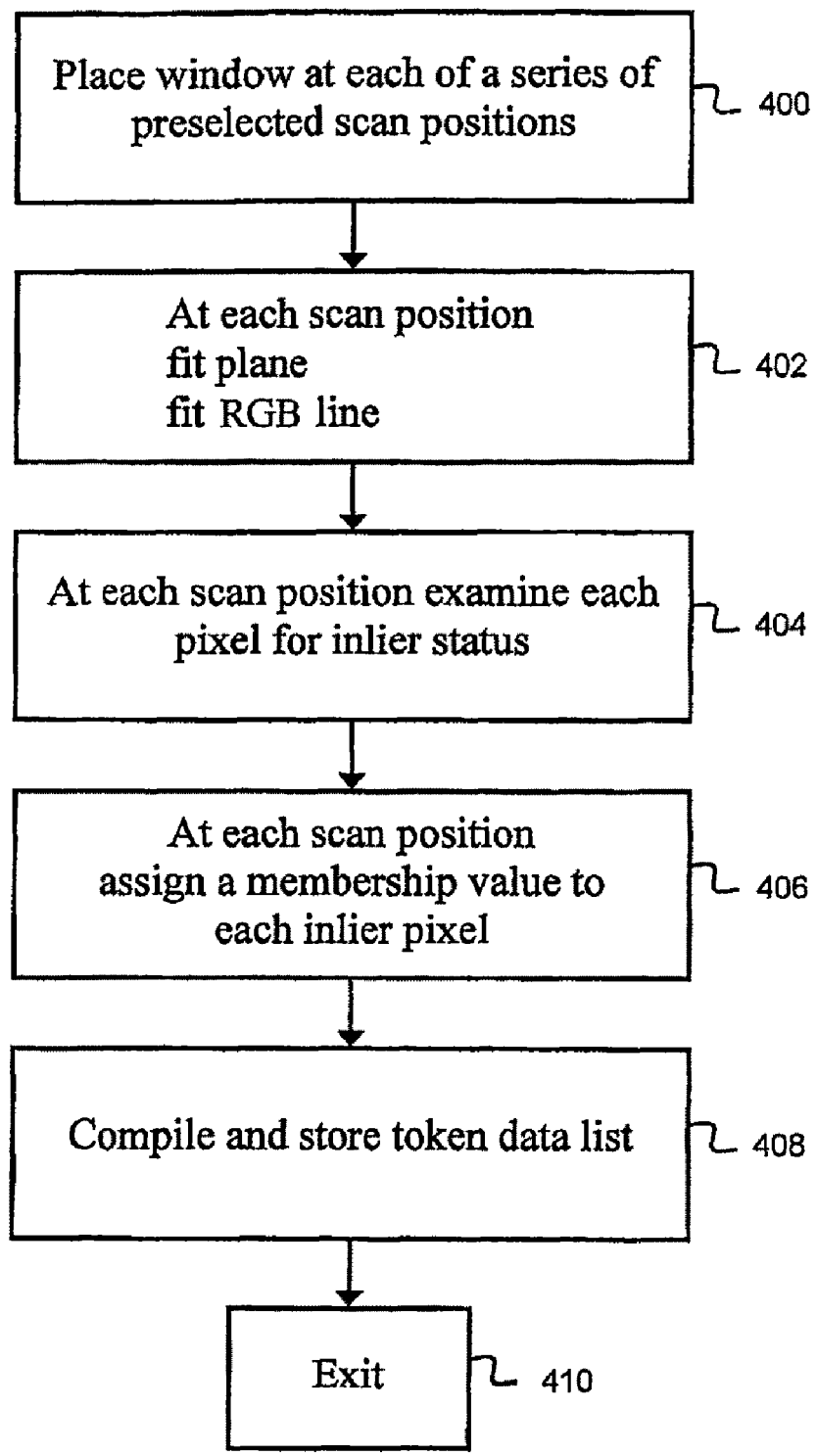
FIG. 8 is a flow chart for generating Type C tokens via a local token analysis technique, according to a feature of the present invention.

A third exemplary technique according to the present invention, for using Type C tokens to create Type B tokens, is a local token analysis. A local token approach generates Type C tokens using a window analysis of a scene depicted in an image file 18. Such tokens are designated as Type $C_w$ tokens. FIG. 8 is a flow chart for generating Type $C_w$ tokens via the local token analysis technique, according to a feature of the present invention.

In step 400, the CPU 12 places a window of fixed size, for example, a 33×33 pixel array mask, over a preselected series of scan positions over the image. The window can be a shape other than a square. The scan positions are offset from one another by a fixed amount, for example ½ window size, and are arranged, in total, to fully cover the image. The window area of pixels at each scan position generates a Type $C_w$ token, though not every pixel within the window at the respective scan position is in the Type $C_w$ token generated at the respective scan position.

At each scan position (step 402), the CPU 12 operates, as a function of the pixels within the window, to fit each of a set of planes, one corresponding to the intensity of each color channel (for example, RGB), and an RGB line in RGB space, characterized by a start point $I_0$ and an end point $I_1$ of the colors within the window. The planar fit provides a spatial representation of the pixel intensity within the window, and the line fit provides a spectral representation of the pixels within the window.

For the planar fit, the planes are defined by the equations:

$$R = X_{Rn} + Y_{Rm} + Z_R \; G = X_{Gn} + Y_{Gm} + Z_G \; B = X_{Bn} + Y_{Bm} + Z_B$$

wherein parameter values X, Y and C are determined by CPU 12 by executing a mathematical operation such as the least median of squares regression discussed above, a least-squares estimator, such as singular value decomposition, or a robust estimator such as RANSAC (see, for example, M. A. Fischler, R. C. Bolles. Random Sample Consensus: A Paradigm for Model Fitting with Applications to Image Analysis and Automated Cartography. Comm. of the ACM, Vol 24, pp 381-395, 1981).

For the RGB line fit, the line is defined by:
$I(r,g,b) = I_0(r,g,b) + t(I_1(r,g,b) - I_0(r,g,b))$ wherein the parameter t has a value between 0 and 1, and can be determined by the CPU 12 utilizing any of the mathematical techniques used to find the planar fit.

At each scan position, after completion of step 402, the CPU 12 operates in step 404 to examine each pixel in the window in respect of each of the planar fit representation and RGB line representation corresponding to the respective window scan position. For each pixel, the CPU 12 determines an error factor for the pixel relative to each of the established planes and RGB line. The error factor is related to the absolute distance of the pixel to its projection on either from either the planar fit or the RGB line fit. The error factor can be a function of the noise present in the recording equipment or be a percentage of the maximum RGB value within the window, for example 1%. Any pixel distance within the error factor relative to either the spatial planar fit or the spectral line fit is labeled an inlier for the Type $C_w$ token being generated at the respective scan position. The CPU 12 also records for the Type $C_w$ token being generated at the respective scan position, a list of all inlier pixels.

At each scan position, after completion of step 404, the CPU 12 operates in step 406 to assign a membership value to each inlier pixel in the window. The membership value can be based upon the distance of the inlier pixel from either the planar fit or the RGB line fit. In one exemplary embodiment of the present invention, the membership value is the inverse of the distance used to determine inlier status for the pixel. In a second exemplary embodiment, a zero-centered Gaussian distribution with a standard deviation is executed to calculate membership values for the inlier pixels.

After all of the scan positions are processed to generate the Type $C_w$ tokens, one per scan position, the CPU 12 operates to compile and store a token data list (step 408). The token data list contains two lists. A first list lists all of the pixels in the image file 18, and for each pixel, an indication of each Type $C_w$ token to which it labeled as an inlier pixel, and the corresponding membership value. A second list lists all of the generated Type $C_w$ tokens, and for each token an indication of the inlier pixels of the respective token, and the corresponding membership value. After compiling and storing the token data list, the CPU 12 exits the routine (step 410).

Figure 9:
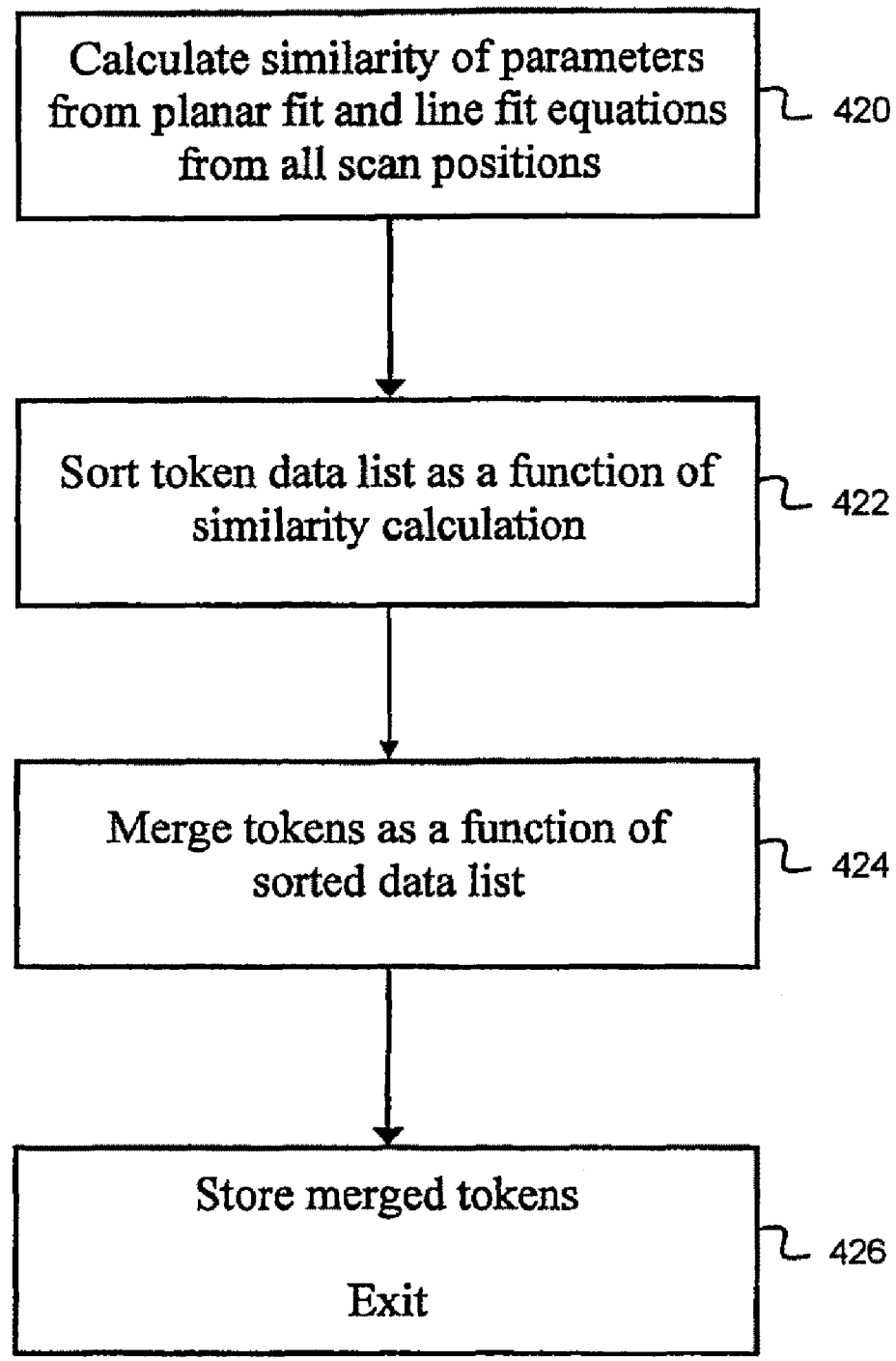
FIG. 9 is a flow chart for constructing Type B tokens from Type C tokens generated via the local token analysis technique of FIG. 8, according to a feature of the present invention.

FIG. 9 is a flow chart for constructing Type B tokens from the Type $C_w$ tokens generated via the local token analysis technique, according to a feature of the present invention. In step 420, the CPU 12 calculates a similarity of parameters of the spatial planer dimensions and spectral RGB lines of adjacent or overlapping Type $C_w$ tokens generated through execution of the routine of FIG. 8. Overlapping and adjacent Type $C_w$ tokens can be defined as tokens corresponding to scan positions that overlap or are contiguous. A similarity threshold can be set as a percentage of difference between each of the spatial planer dimensions and spectral RGB lines of two overlapping or adjacent Type $C_w$ tokens being compared. The percentage can be a function of the noise of, for example, the camera 14 used to record the scene of the image file 18. All overlapping or adjacent Type $C_w$ token pairs having a calculated similarity within the similarity threshold are placed on a list.

In step 422, the CPU 12 sorts the list of overlapping or adjacent Type $C_w$ token pairs having a calculated similarity within the similarity threshold, in the order of most similar to least similar pairs. In step 424, the CPU 12 merges similar token pairs, in the order of the sort, and labeling pairs as per degree of similarity. Each merged token pair will be considered a $Type_B$ token. In step 426, the CPU 12 stores the list of $Type_B$ tokens, and exits the routine.

In one exemplary embodiment of the present invention, the CPU 12 compiles lists of $Type_B$ tokens separately generated through each of and/or a combination of one or more of the arbitrary boundary removal, adjacent planar token merging, and local token analysis techniques. The determination of the combination of techniques used depends in part on whether a particular region of the image was filtered because of texturing of the image. Since each $Type_B$ token generated through the described techniques likely represents a single material under varying illumination conditions, merging sufficiently overlapping $Type_B$ tokens provides a resulting, merged $Type_B$ token that represents a more extensive area of the image comprising a single material, and approaches the extent of a $Type_A$ token. Sufficiently overlapping can be defined by satisfaction of certain pixel characteristic criteria, such as, for example:

A) The two $Type_B$ tokens have at least n of the original $Type_C$ tokens in common, for example, n=1

B) The two $Type_B$ tokens have at least n pixels in common, for example, n=20

C) The two $Type_B$ tokens have at least n % overlap, that is at least n % of the pixels in a first one of the two $Type_B$ tokens are also found in the second one of the two $Type_B$ tokens or vice versa, wherein, for example n %=10%.

D) The percentage of pixels in a smaller one of the two $Type_B$ tokens, also found in the larger one of the two $Type_B$ tokens is above a preselected threshold, for example 15%.

E) A preselected combination of criteria A-D.

Merging of two sufficiently overlapping $Type_B$ tokens can be accomplished via a mathematical operation such as execution of the union find algorithm discussed above. In the case of two overlapping $Type_B$ tokens that do not satisfy the above discussed criteria, the overlapping pixels of the two tokens can be assigned to the larger one of the two $Type_B$ tokens.

As a result of execution of the token generation and merging techniques according to features of the present invention, an image can be accurately divided into tokens representing discrete materials depicted in the scene. As noted above, FIG. 3c shows token regions corresponding to the region map, for example, as identified through execution of the routine of FIG. 3a (Type C tokens), in respect to the image of FIG. 3b. FIG. 3d shows the Type B tokens generated from the Type C tokens of FIG. 3c, as described above. The Type B tokens define boundaries between them, within the image and between what are most likely single material regions of the image associated with the various constructed Type B tokens.

Referring now to FIG. 3e, there is shown a detail of a boundary 26 between two of the Type B tokens of FIG. 3d. According to a feature of the present invention, a representation of the boundary 26 is constructed from contiguous pixels located at the boundary 26 and extending within each of the Type B tokens defining the boundary 26. The pixel representation is used to facilitate an analysis of the boundary 26 for classification of the boundary 26 as a material boundary on a smooth surface (rather than another type of boundary, for example, an illumination edge, depth boundary or simultaneous illumination and material change). The pixel representation is configured to provide samples of pixels relevant to the boundary, for example, pixel arrays comprising pads 28 within each of the Type B tokens forming the boundary 26 that can be subject to spatio-spectral analysis as a function of respective token color values (for example, R, G, B values) of the pixels provided by the pads 28. The samples are compared to determine the likelihood of the boundary 26 corresponding to a material change.

As noted above, in one preferred embodiment of the present invention, the pixel representation of the boundary is a pad representation comprising arrays of selected pixels around the boundary 26. The CPU 12 is operated to generate the pad configuration by traversing perimeter pixels of a first Type B token 30, and determining the distance to a corresponding perimeter pixel of the Type B token 32 on the opposite side of the boundary 26.

When a closest distance between perimeter pixels is located, that location is then used as a starting point for generation of the representation. A pixel 34 (size exaggerated in the drawing for illustration purposes) in the exact middle of the located closest distance between corresponding perimeter pixels of the Type B tokens 30,32 defines a first segment of the representation. The CPU 12 then traverses pixels in a direction perpendicular to the boundary 26, within the Type B token 30 for a number of pixels, for example 10-12 pixels, from the pixel 34. At that location, the CPU 12 identifies one of the pads 28 as an array of pixels, for example, a 3×3 pixel array, around the location 10-12 pixels distant from the pixel 34. The CPU 12 repeats the same operation in respect of the Type B token 32 to define a pair of pads 28, one on either side of the pixel 34, and one pad 28, each in one of the Type B tokens 30,32, forming the boundary 26.

Upon the completion of a first segment comprising a pair of pads 28, the CPU 12 generates a series of additional pad pairs along the entire length of the subject boundary 26. To that end, the CPU 12 identifies boundary pixels 36, on either side of the pixel 34, separated from one another by a fixed number of pixels, for example 5 pixels, and each arranged in the boundary between perimeter pixels of the Type B tokens 30,32. For each boundary pixel 36, the CPU 12 identifies a pair of pads 28, one on either side of the respective pixel 36, and one pad 28, each in one of the Type B tokens 30,32, forming the boundary 26, in the same manner as executed in respect of the pair of pads around the pixel 34. The CPU 12 is operated to generate a pad representation for each boundary defined by the Type B tokens of FIG. 3d.

Figure 3F:
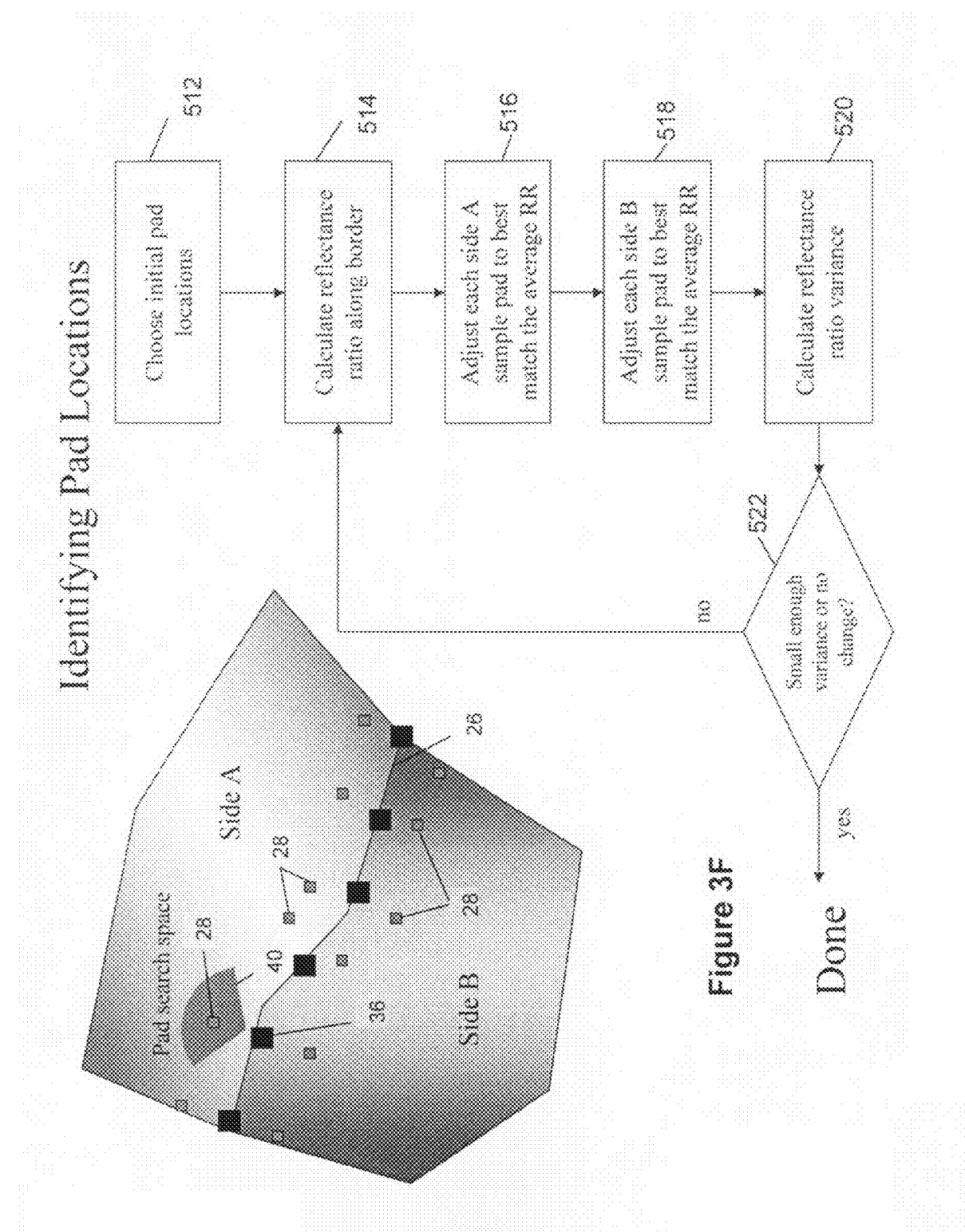
FIG. 3*f* shows the representation of FIG. 3*e* and a flow chart for identifying locations within the representation of FIG. 3*e*.
Figure 10:
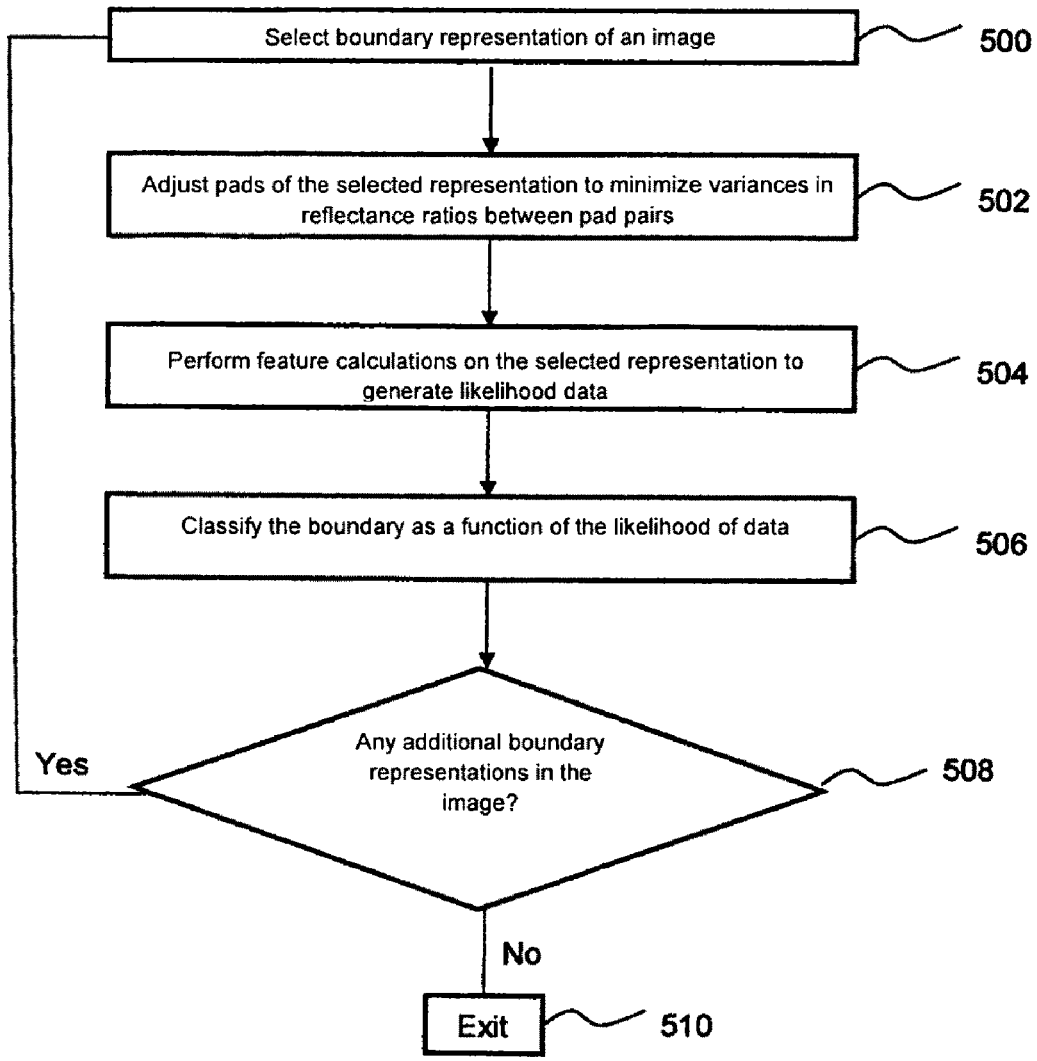
FIG. 10 is a flow chart for calculating boundary features utilizing a representation of the boundary, according to a feature of the present invention.

Referring now to FIG. 10, there is shown a flow chart of the spatio-spectral analysis used for calculating the set of boundary features utilizing a representation of the boundary, for example, the representation of FIG. 3e, according to a feature of the present invention. In step 500, the CPU 12 selects a representation of a boundary 26 previously generated by the CPU 12, for example, as described above. In step 502, the CPU 12 adjusts locations of the pixels of the pads 28 of the selected representation to minimize variances from an average reflectance ratio between opposing pads 28 of the representation 28. FIG. 3f shows a flow chart for a sub-routine executed by the CPU12, as follows:

1. Initial pad locations are selected during generation of the representation (step 512)(see illustration of FIG. 3f).
2. In step 514, the CPU 12 calculates the average for the reflectance ratios of the pad pairs of the representation, i.e. for each pad pair determine the reflectance ratio (RR) between the mean color values for the pads 28 of the respective pad pair, then determine the average for all the ratios of the representation.
3. In steps 516 and 518, the CPU 12 changes positions of the pads 28 to reduce a variance between the ratio of a particular pair and the average for the boundary:
   Go through the pads 28 in random order, and for each pad pair:
   i. Considering one of the pads 28 on side A of a selected pair, test if there is any small change in the pad's location (through a pad search space 40, see illustration in FIG. 3f, for example, all locations more than two pixels from the boundary pixel 36, but less than ten pixels from the boundary pixel 36) that could make the reflectance ratio with the pad 28 on the other side of the respective pad pair more like the average reflectance ratio for the representation, as calculated in step 514.
   ii. Follow the same procedure for the pad on the other side (side B).
4. In step 520 the CPU12 calculates a new average ratio for the representation, and calculates the variance between the average ratio and the ratio of each pad pair, after the position change analysis of steps 516 and 518.

5. In step 522 the CPU 12 determines whether the variances are within a threshold value, if no, the routine of steps 514-520 is repeated, if yes, the CPU 12 exits the routine.

Once again referring to FIG. 10, upon completion of step 502, the CPU 12 proceeds to step 504. In step 504, the CPU 12 performs a series of spatio-spectral tests on the pixels of the representation, including calculations to generate data indicating the likelihood as to whether the boundary change is a material change. The combination of test results provides a feature vector that can be utilized in a decision operation to identify and classify the nature of the boundary 26.

A first test comprises a log of gradient match. The test examines a matching between the gradients parallel to the border on each side (upper and lower sides of the representation shown in FIG. 3e) of the representation. The log of the gradients is used to account for materials with different intensities. The CPU 12 operates to:

1. Initialize a sum variable to zero, E=0;
2. For each pad 28
   (a) For each side, calculate the difference between the mean color value of the current pad and a next pad (gradient);
   (b) For each side, take the log of the difference (log of gradient);
   (c) Calculate the sum-squared difference between the upper and lower logged differences (with respect to the upper pads 28 and lower pads 28 of the representation shown in FIG. 3e);
   (d) Add the value to E;
3. Convert E to a mathematical pseudo-likelihood, for example:

$$L = \frac{1.0}{1.0 + 10.0 e^{500(E-0.015)}}$$

A next test comprises a matching of the left and right side gradients using dynamic time warping (DTW). In this test the CPU 12 operates to:

1. For each pad pair of the representation:
   (a) For each side, trace a line parallel to the boundary 26, from pad location to pad location (see FIG. 3g);
   (b) For each side, upper and lower, add the points of the respective line to a vector, either $V_{(U)}$ or $V_{(L)}$ (see FIG. 3g);
2. Compute the log of the gradient of each of $V_{(U)}$ and $V_{(L)}$, put the results in $\nabla V_{(U)}$ and $\nabla V_{(L)}$;
3. Compare $\nabla V_{(L)}$ with $\nabla V_{(R)}$ using dynamic time warping to produce an error measure E;
4. Convert E to a mathematical pseudo-likelihood, for example:

$$L = \frac{1.0}{1.0 + 10.0 e^{1000(E-0.01)}}$$

In a third test, the CPU 12 executes a log space matching operation:

1. For each side (FIG. 3e), collect all of the mean color values of the pads 28 into a vector and sort it according to pixel intensity;
2. For each side, select the 5th percentile and 95th percentile pixels as dark and light examples, respectively;
3. For each side, calculate the Euclidean distance between the log of the bright and dark pixels, $D_{(R)}$ and $D_{(L)}$;
4. Compute the difference between the two distances, $E_{(1)} = D_{(R)} - D_{(L)}$;
5. Convert $E_{(1)}$ to a mathematical pseudo-likelihood, for example:

$$p(1) = e^{10}(\text{square of } E(1))$$

6. For each side, calculate the primary eigenvector for the covariance matrix of the border pixels using, for example, singular value decomposition [SVD];
7. Calculate the dot product of the two primary eigenvectors (one for each side) and put the result in $E_{(2)}$;
8. Convert $E_{(2)}$ into a pseudo-likelihood, for example, use it directly $p(2) = E_{(2)}$;
9. Combine the length and orientation likelihoods to produce a final pseudo-likelihood: $L = p(1) p(2)$.

In a fourth test, the CPU 12 executes a multi-scale ratio matching for each centipede pad pair. The CPU 12 operates to:

1. For each side (FIG. 3e), collect all of the mean color values of the pads 28 into a vector, sorted by their order along the border;
2. Initialize a collection variable P and a counter variable N;.
3. For each pad i:
   For each distance d from, for example, 1 to 3:
   i. If each band of pad i on one side is brighter than its counterpart on the other side and each band of pad i+d exhibits the same relationship between sides
      Calculate the probability p that the reflectance ratio between the upper and lower pads at location i is equivalent to the reflectance ratio for the upper and lower pads at location i+d using a noise model (for example, a linear noise model that takes into account a constant term and a term that is linear in image intensity);
      Add the result p to the collection variation P
      Increment the counter variable N
   ii. Otherwise, if the colors at the two pad locations are not similar, for example, have a ratio in some color band greater than R(m)ax (e.g. 1.3) or less than R(m)in (e.g. 0.77) add 0 to P and increment the counter variable N.;
4. If N>0 calculate a pseudo-likelihood from P and N, for example, L=P/N;
5. Otherwise set the likelihood to zero L=0.

In a further test, the CPU 12 utilizes a bi-illuminant dichromatic reflection model (BIDR model) of the image. According to a prediction of the BIDR model, if all the pixels of two Type B tokens are from a single material under a direct/ambient pair of illuminants, then the pixels will be well represented by a line in RGB space. A pad linearity test can be devised to determine how well the mean color values of the pads 28 on either side of the representation (FIG. 3e) approximate a line in RGB space. For more information on the BIDR model, reference is made to U.S. application Ser. No. 11/341,751, filed Jan. 27, 2006, published as U.S. Patent Application 20070176940 on Aug. 2, 2007. In the pad linearity test, the CPU 12 operates to:

1. For each side s∈{left, right}
   (a) Collect the mean color values of the pads 28 into a vector;
   (b) Calculate first and second eigenvectors (e(1), e(2)) and eigenvalues of the covariance matrix, for example, using SVD;

(c) Calculate the ratio of the first to the second eigenvector R=e(1)/e(2), if the second eigenvalue is zero, let R=20, unless the first eigenvector is also zero, in which case R=0;
(d) Convert the ratio into a mathematical pseudo-likelihood, for example, using:

$$R_s = \left(\frac{1}{e^{-a(R-c)}} - f\right)\frac{1}{1-f}$$

where:

$$f = \frac{1}{1 + e^{ac}}$$

and example values for the constants are α=12 and c=0.5;
(e) Project each pad mean value onto the first eigenvector and calculate the minimum and maximum distance along the eigenvector, $D_{(min)}$ and $D_{(max)}$;
(f) Divide the distance $D_{(max)}$-$D_{(min)}$ into K bins (e.g. K=5);
(g) Build a histogram of how many pixels at are at each distance along the first eigenvector;
(h) Count how many bins have no more than C pixels in them (e.g. C=0) and store the result in $E_{(s)}$.

2. Convert the calculated pseudo-likelihoods into a single pseudo-likelihood using, for example:

$$L = R_{(left)}R_{(right)}(E_{(left)}E_{(right)})^{0.7}$$

In a sixth test, the CPU 12 performs a test to determine whether the pads 28, on each side of the representation (FIG. 3e), corresponds to a reasonable direct/ambient illuminant pair of the bi-illuminant. In this test, the CPU 12 operates to:

1. For each side s∈{left, right}
   (a) Collect all of the mean color values of the pads 28 into a vector;
   (b) Calculate the primary eigenvector e(1) of the covariance matrix of the pixels, for example, using SVD;
   (c) If the elements of e(1) do not all have the same sign, let $R_{(s)}$=1;
   (d) Otherwise, multiply e(1) by either 1 or −1 so that it is all positive and calculate its saturation:

$$R_{(s)} = \max(R, G, B) - \min(R, G, B)/\max(R, G, B);$$

(e) Convert $R_{(s)}$ to a pseudo-likelihood using, for example:

$$L_s = 1.0 - \frac{1.0}{1.0 + e^{-a(R_s-M)}}$$

where example values for the constants are α=25 and M=0.65.

In a yet further test, the CPU 12 tests for a degree of variation among the mean color values of the pads 28 on each side of the representation (FIG. 3e). The greater the degree of variation, the greater the amount of information relevant to the nature of the boundary change. The CPU 12 operates to:

1. For each side, calculate the minimum, maximum and average intensities of the mean color values of the pads 28;
2. For each side, calculate a normalized variation as $V_{(side)}$=(maximum−minimum)/average;
3. For each side, convert the normalized variation to a pseudo-likelihood using, for example:

$$L_{side} = \frac{1.0}{1.0 + e^{-alpha(V_{side}-M)}}$$

where example values for the constants are α=25 and M=0.4.

4. Combine the pseudo-likelihoods for each side using, for example, $L=L_{(left)}L_{(right)}$.

Figure 3H:
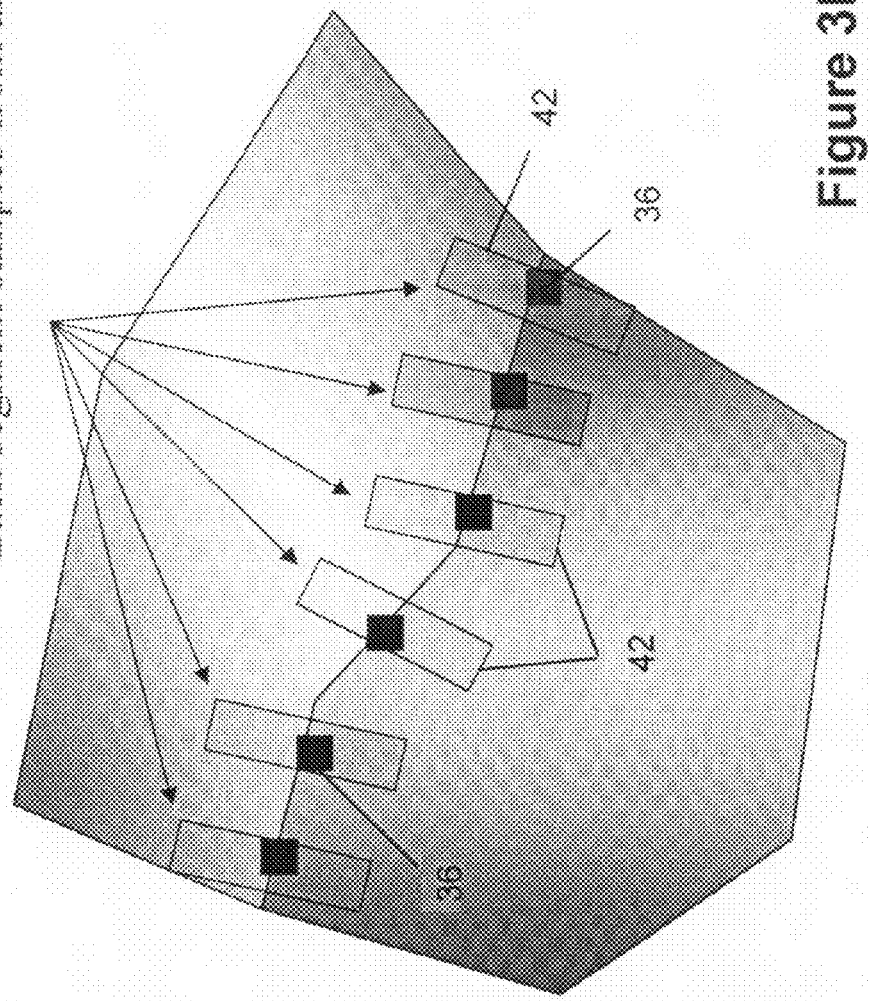
FIG. 3*h* shows yet another representation of a boundary between two Type B tokens of FIG. 3*d*, according to a feature of the present invention.

A next test comprises a strip token test. The CPU 12 calculates a strip token representation, comprising a series of strip tokens 42 (see FIG. 3h), one per boundary pixel 36 and each extending 8-10 pixels from the respective boundary pixel and 2-4 pixels in width. The CPU 12 analyzes the sharpness of the strip token 42 on each side, where sharpness is defined as the maximum difference between two adjacent pixels in the strip as a fraction of the maximum change over the entire strip. The CPU 12 operates to:

1. Generate a set of strips of pixels (e.g. 2×8 pixels in size), that are centered along the border and oriented to be perpendicular to it (see FIG. 3h);
2. For each strip, calculate its sharpness as the ratio of the maximum difference between any two adjacent pixels in the strip to the difference between the maximum and minimum intensity pixels within the strip;
3. Calculate the average sharpness over all strips;
4. Return the average sharpness (S) as a pseudo-likelihood.

In a next strip token test, the CPU 12 performs an analysis of the linearity of each strip. The CPU 12 operates to:

1. Generate a set of strips of pixels (e.g. 2×8 pixels in size, see FIG. 3h), that are centered along the border and oriented to be perpendicular to it;
2. For each strip, calculate its degree of linearity using the ratio of the first and second eigenvalues of the covariance matrix of the pixels within the strip;
3. For each strip i, convert its linearity $l_{(i)}$ into a pseudo-likelihood using, for example:

$$L_i = \frac{1.0}{1 + e^{-a(l_i - C)}}$$

where example values for the constants are α=0.5 and C=10.

In yet another strip token test, the CPU 12 examines how the image changes perpendicular to each strip token. The CPU operates to:

1. Generate a set of N strips of pixels (e.g. 2×8 pixels in size) (see FIG. 3h);
2. Initialize a counter C=0;
3. For each strip, identify the edge pixels on the strip
   (a) For each edge pixel p:
      i Examine M pixels in a line perpendicular to the long axis of the strip
      ii. For each of the M pixels, calculate the similarity to the edge pixel p using a noise model
      iii. If any of the Mpixels differs fromp, consider the strip to have failed the test and increment C;
4. Convert the count of failed strips to a pseudo-likelihood by calculating the percentage that failed L=C/N.

In summation, the series of tests described above serve to provide a measure of various characteristics of the boundary 26 relevant to the nature of the boundary as being a material edge. The first two tests provide a measure of a fine similarity of illumination change along the boundary 26. The third test evaluates a gross similarity of illumination change. The fourth test examines local continuity in illumination conditions. As noted, the fifth test provides a gross match analysis of a BIDR model prediction. The sixth test examines the overall qualities of a bi-illuminant. The seventh test measures the degree of variation of color values within pads, an indication of the quantity of information relevant to the nature of the boundary change. The eighth through tenth tests are strip token tests used to evaluate the spatial quality of changes in appearance. Of these strip token tests, the ninth test includes an examination of the linearity predicted by the BIDR model.

Upon completion of the set of tests for feature calculation (step 504), the CPU 12 proceeds to step 506. In step 506, the CPU 12 executes a computer learning technique to analyze the mathematically determined pseudo-likelihood data accumulated via the test operations of the CPU 12. The CPU 12 forms a feature vector from the various likelihoods L determined in the tests of step 504. The CPU 12 is then operated to learn a classifier that can make a decision about whether the feature vector indicates a boundary that is most probably a material boundary rather than another type of boundary, for example, an illumination edge, depth boundary or simultaneous illumination and material change. For example, a neural network with an input for each pseudo-likelihood can be trained to output a decision. Other example methods include support vector machines [SVM], Bayesian decision trees, or boosting.

In step 508, the CPU 12 determines if there any additional boundaries for analysis. If yes, the CPU 12 returns to step 500. If no, the CPU 12 exits the routine (step 510).

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
providing an image file depicting the image;
identifying a boundary in the image;
calculating a representation of the boundary extending to segments of the image at either side of the boundary;
performing feature calculations on the representation, the feature calculations comprising performance of a series of spatio-spectral tests on pixels in the representation, to generate data indicating a likelihood as to whether the boundary is a material boundary, wherein the series of spatio-spectral tests are selected from a group of tests for measuring characteristics of the boundary including a fine similarity of illumination change along the boundary, a gross similarity of illumination change, local continuity in illumination conditions, a gross match analysis of a BIDR model prediction, overall qualities of a bi-illuminant, a degree of variation of color values, an indication of the quantity of information relevant to the nature of the boundary change, a spatial quality of changes in appearance, linearity predicted by the BIDR model and a combination of the measured characteristics from the group; and
classifying the boundary as caused by a material change, as a function of the feature calculations.

2. The method of claim 1 wherein the step of identifying a boundary in the image is carried out by identifying spatio-spectral information for the image, utilizing the spatio-spectral information to identify single material token regions, and utilizing the single material token regions to identify a boundary in the image.

3. The method of claim 1 wherein the step of calculating a representation of the boundary is carried out by generating a pad representation of the boundary.

4. The method of claim 3 wherein the pad representation comprises an arrangement of pads distributed along either side of the boundary, and each one of the pads comprises an array of contiguous pixels.

5. The method of claim 1 wherein the step of calculating a representation of the boundary is carried out by generating a strip token representation of the boundary.

6. The method of claim 1 wherein the step of classifying the boundary as caused by a material change, as a function of the feature calculations, is carried out by performing a computer learning technique.

7. The method of claim 6 wherein the computer learning technique comprises a technique selected from the group consisting of a neural network, a support vector machine, a Bayesian decision tree and boosting.

8. An automated, computerized method for processing an image, comprising the steps of:
providing an image file including pixels forming the image;
identifying a boundary in the image;
selecting representative pixels of the image relevant to the boundary;
performing a feature calculation on the representative pixels, the feature calculation comprising performance of a series of spatio-spectral tests on the pixels, to generate data indicating a likelihood as to whether the boundary is a material boundary, wherein the series of spatio-spectral tests are selected from a group of tests for measuring characteristics of the boundary including a fine similarity of illumination change along the boundary, a gross similarity of illumination change, local continuity in illumination conditions, a gross match analysis of a BIDR model prediction, overall qualities of a bi-illuminant, a degree of variation of color values, an indication of the quantity of information relevant to the nature of the boundary change, a spatial quality of changes in appearance, linearity predicted by the BIDR model and a combination of the measured characteristics from the group; and
classifying the boundary as caused by a material change, as a function of the feature calculation.

9. The method of claim 8 wherein the step of identifying a boundary in the image is carried out by identifying spatio-spectral information for the image, utilizing the spatio-spectral information to identify single material token regions, and utilizing the single material token regions to identify a boundary in the image.

10. The method of claim 8 wherein the step of selecting representative pixels of the image relevant to the boundary is carried out by generating a pad representation of the boundary.

11. The method of claim 10 wherein the pad representation comprises an arrangement of pads distributed along either side of the boundary, and each one of the pads comprises an array of contiguous pixels.

12. The method of claim 8 wherein the step of selecting representative pixels of the image relevant to the boundary is carried out by generating a strip token representation of the boundary.

13. The method of claim 8 wherein the group of tests includes a log of gradient match, dynamic time warping, a log space matching, a multi-scale ratio matching, a pad linearity test, a reasonable direct/ambient illuminant pair test, a degree of variation test, a sharpness of strip token test, a linearity of strip token test and an image change test.

14. The method of claim 8 wherein the step of classifying the boundary as caused by a material change, as a function of a feature calculation is carried out by performing a computer learning technique.

15. The method of claim 14 wherein the computer learning technique comprises a technique selected from the group consisting of a neural network, a support vector machine, a Bayesian decision tree and boosting.

16. A computer system which comprises: a CPU; and a memory storing an image file containing an image; the CPU arranged and configured to execute a routine to identify a boundary in the image, calculate a representation of the boundary extending to segments of the image at either side of the boundary, perform feature calculations on the representation, the feature calculations comprising performance of a series of spatio-spectral tests on pixels in the representation, to generate data indicating a likelihood as to whether the boundary is a material boundary, wherein the series of spatio-spectral tests are selected from a group of tests for measuring characteristics of the boundary including a fine similarity of illumination change along the boundary, a gross similarity of illumination change, local continuity in illumination conditions, a gross match analysis of a BIDR model prediction, overall qualities of a bi-illuminant, a degree of variation of color values, an indication of the quantity of information relevant to the nature of the boundary change, a spatial quality of changes in appearance, linearity predicted by the BIDR model and a combination of the measured characteristics from the group, and classify the boundary as caused by a material change, as a function of the feature calculations.

17. A computer system which comprises:
a CPU; and a memory storing an image file including pixels forming an image;
the CPU arranged and configured to execute a routine to identify a boundary in the image, select representative pixels of the image relevant to the boundary, perform a feature calculation on the representative pixels, the feature calculation comprising performance of a series of spatio-spectral tests on the pixels, to generate data indicating a likelihood as to whether the boundary is a material boundary, wherein the series of spatio-spectral tests are selected from a group of tests for measuring characteristics of the boundary including a fine similarity of illumination change along the boundary, a gross similarity of illumination change, local continuity in illumination conditions, a gross match analysis of a BIDR model prediction, overall qualities of a bi-illuminant, a degree of variation of color values, an indication of the quantity of information relevant to the nature of the boundary change, a spatial quality of changes in appearance, linearity predicted by the BIDR model and a combination of the measured characteristics from the group, and classify the boundary as caused by a material change, as a function of the feature calculation.

* * * * *